United States Patent
Beardwood et al.

(10) Patent No.: US 6,510,368 B1
(45) Date of Patent: Jan. 21, 2003

(54) PERFORMANCE-BASED CONTROL SYSTEM

(75) Inventors: Edward S. Beardwood, Aurora (CA); George Freedman Hays, Morristown, NJ (US); James George Knudsen, Corvallis, OR (US)

(73) Assignee: Ashland Inc., Dublin, OH (US)

(*) Notice: Subject to any disclaimer, the term of this patent is extended or adjusted under 35 U.S.C. 154(b) by 0 days.

(21) Appl. No.: 09/548,626

(22) Filed: Apr. 13, 2000

Related U.S. Application Data

(62) Division of application No. 09/221,601, filed on Dec. 29, 1998, now Pat. No. 6,068,012.

(51) Int. Cl.⁷ .......................... G05B 11/02; G05B 21/00; G05D 11/00
(52) U.S. Cl. .......................... 700/266; 700/71; 700/282; 700/285; 137/3; 137/93
(58) Field of Search .............................. 700/34, 53, 54, 700/71, 266, 267, 281, 282, 285; 137/3, 4, 5, 88, 91, 93

(56) References Cited

U.S. PATENT DOCUMENTS

| | | | | |
|---|---|---|---|---|
| 4,648,043 A | * | 3/1987 | O'Leary | 137/93 |
| 5,171,450 A | * | 12/1992 | Hoots | 210/698 |
| 5,246,026 A | * | 9/1993 | Proudman | 137/101.19 |
| 5,363,874 A | * | 11/1994 | Henszey et al. | 137/14 |
| 5,422,014 A | * | 6/1995 | Allen et al. | 210/139 |
| 5,428,527 A | * | 6/1995 | Niemi | 700/266 |
| 5,576,481 A | * | 11/1996 | Beardwood | 73/61.62 |
| 5,671,153 A | * | 9/1997 | Brinkmeyer et al. | 422/110 |
| 5,730,879 A | * | 3/1998 | Wilding et al. | 210/662 |
| 5,736,405 A | * | 4/1998 | Alfano et al. | 436/119 |
| 5,829,466 A | * | 11/1998 | Church | 137/4 |
| 5,855,791 A | | 1/1999 | Hays et al. | |
| 5,923,571 A | * | 7/1999 | Gunther et al. | 700/266 |
| 5,960,808 A | * | 10/1999 | Ferguson et al. | 137/5 |
| 6,216,092 B1 | * | 4/2001 | Kong | 210/660 |

FOREIGN PATENT DOCUMENTS

ZA    9 701 350 A    12/1997

OTHER PUBLICATIONS

EPO Supplemental Search Report dated Aug. 8, 2002.

* cited by examiner

Primary Examiner—Leo Picard
Assistant Examiner—Elliott Frank
(74) Attorney, Agent, or Firm—Connolly Bove Lodge & Hutz, LLP; Larry J. Hume; David L. Hedden

(57) ABSTRACT

A process for monitoring and controlling an aqueous system. At least one performance parameter relating to conditions within the aqueous system is selected. A value of the at least one performance parameter is measured to serve as a baseline value. A capacity of the aqueous system is determined and flow rates of water into and out of the system are measured and monitored. The value of the at least one performance parameter is measured and compared the value to the baseline for the performance parameter. Flow rates of water into and out of the system are factored in. At least one controllable variable within the aqueous system is altered based upon a deviation of the value of the at least one performance parameter from the baseline value.

6 Claims, 7 Drawing Sheets

FIG. 3 INSTANTANEOUS CORROSION MEASUREMENTS

PERFORMANCE-BASED CONTROL SYSTEM

CROSS-REFERENCE TO RELATED APPLICATIONS

This application is a divisional application of U.S. application Ser. No. 09/221,601 by BEARDWOOD et al., filed on Dec. 29, 1998 for "PERFORMANCE-BASED CONTROL SYSTEM", now issued as U.S. Pat. No. 6,068,012, the entire contents of which are hereby incorporated by reference, and for which priority is claimed under 35 U.S.C. §120.

FIELD OF THE INVENTION

The invention relates to systems, including method and apparatus, for controlling chemical treatment and water quality within cooling systems by measuring corrosion and fouling to adjust treatment control parameters in the cooling systems.

BACKGROUND OF THE INVENTION

The purpose of a cooling system is to remove heat from a process and discharge that heat to the environment through evaporation and liquid discharge. An example of such systems are cooling water systems used to remove heat from a turbine-condenser. Removing the heat causes steam to condense, resulting in a pressure reduction on the steam-condensate side of the condenser, and an increase in the amount of power generated per unit of fuel used to produce the steam. Similarly, another example of such a system is a refrigeration machine. Such a machine may utilize a refrigerant, such as R-11, R-12 or R-134A, to extract heat from a chilled medium, such as water, loop and transfer the heat to a cooling system.

Another example of a cooling system is one in which heat from a process or series of processes may be transferred to the cooling medium through a process heat exchanger, such as an intercooler on an gas compressor. The operating efficiency of a multi-stage gas compressor, such as an oxygen or nitrogen compressor, may be directly tied to the temperature and pressure of the gas stream entering each stage of the compressor. The higher the temperature and pressure above design conditions, the more power will be required to compress the same amount of gas.

According to one example of a cooling system, the cooling medium includes a liquid, such as water. Such a cooling system may comprise (1) at least one heat exchanger for removing heat from one or more processes; (2) at least one pump for circulating the cooling medium through the at least one heat exchanger; (3) means for cooling the cooling medium, such as a cooling cower; (4) means for adding new cooling medium to the system, such means is typically referred to as makeup; and (5) means for discharging a certain amount of cooling medium from the system, such discharge is referred to as blowdown.

The cooling effect according to such a system may be achieved by evaporating a fraction of the cooling medium into a stream of air as the cooling medium passes over the cooling tower. During the process of removing heat from the cooling medium, unsaturated air may enter the cooling tower. The unsaturated air may pick up the evaporated fluid and exit the cooling tower at a higher temperature and in a saturated state with respect to the cooling medium.

According to another example of a cooling system, a cooling medium, such as water, may be obtained from a large reservoir of the medium that will provide an adequate supply of the cooling medium at a temperature low enough to absorb heat from a process or processes via at least one heat exchanger. In such an example, the cooling system may include (1) a source for the cooling medium; (2) means for circulating the cooling medium, such as at least one circulating pump; (3) at least one heat exchanger; and (5) a place to discharge the heated cooling medium, such as the same body of cooling medium as the source.

Cooling systems that employ liquid cooling media may be subject to deposition of foulant materials and processes, such as, hardness salts, corrosion products, biomass, silt, and mud from the cooling medium, various process leaks, and in-situ corrosion. These foulant materials and processes may be input into the cooling systems from a variety of sources.

Certain treatment materials may be added to the cooling medium or cooling system to inhibit, among other things, hardness deposition, corrosion, formation of biomasses, and agglomeration of other foulants such as silt, mud, corrosion products and process leaks. Such treatment materials may include one or more chemical components that, in combination, effectively inhibit one or more of the above mentioned problems. For example, a treatment material designed to inhibit corrosion may include at least one cathodic inhibitor, at least one anodic inhibitor, and/or at least one additional material, such as anti-scalant(s), surfactant(s) and anti-foam agent(s). Other treatment materials that may be added to the system/medium may include one or more acids, such as sulfuric acid, or one or more alkaline materials, such as a solution of caustic soda. These additional materials may control the pH of the cooling medium within a predetermined control range. When controlling the pH, the acid would be used to lower the pH and the alkali to raise it.

Typically, the amount of treatment material(s) added to the system/medium may be determined by manual laboratory tests, corrosion coupon analyses, the volume of cooling medium in the system and the amount of cooling medium supplied to the system in a given period of time. In such cases, means, such as a chemical injection pump, may be used for injecting a flow of a treatment material into the system at a constant rate over time.

When adding material(s) to adjust pH, a closed loop chemical injection system may be utilized. For example, the system pH may be monitored by a pH monitoring device that controls a pump or valve to increase or decrease the feed of the pH adjusting agent(s).

Treatment materials used to inhibit the deleterious effects of process leaks are typically controlled manually, either on a continuous basis or upon detection of the occurrence of such a leak. Detecting, locating and quantifying a process leak is a time consuming task that may be performed by a plant operator or treatment professional.

Another important aspect of treatment and control of a cooling system and the quality of the cooling medium relates to maintaining the concentration of dissolved and suspended materials in the medium below the level at which they may precipitate or agglomerate. This is typically accomplished by adjusting the amount of concentrated cooling medium removed from the system via blowdown. Typically, this has been done by manual adjustment of a blowdown valve, based on laboratory analysis of the circulating cooling medium. More recently, blowdown has been automated by monitoring the specific conductivity of the cooling medium and adjusting a blowdown valve to maintain a specified range of conductivity within the system.

Typically, a cooling system includes a cooling medium, such as water. The characteristics or properties of the cooling medium may affect the cooling system and its operation. Cooling medium parameters such as pH, conductivity, corrosion rates, temperatures (such as cold supply, hot return, heat exchanger inlet, and outlet, among others), cooling medium recirculation rate, cooling medium make-up rate and cooling medium blowdown rate have long been monitored to control the characteristics of cooling medium. Blowdown may serve to deconcentrate the dissolved solids in the cooling medium and the makeup replaces all cooling medium losses, including those from evaporation, windage, drift and blowdown. Historically, automated control of cooling systems has been based upon on-line measurements of conductivity and pH, for example. Measurements of these parameters may be supplemented by laboratory wet chemistry tests or residual inhibitor level and other parameters relevant to the specific application.

The use of linear polarization resistance technology for on-line measurement of corrosion rates was previously disclosed in U.S. Pat. Nos. 3,069,322, 3,156,631, 3,250,589, 3,607,673 and 3,698,065, the entire disclosures of all of which are hereby incorporated by reference. In U.S. Pat. No. 4,339,945, to Knudsen, and U.S. Pat. No. 4,346,587, to Knudsen et al., the entire disclosures of both of which are hereby incorporated by reference, a methodology was disclosed where in a device in which the measurement of fouling added to pH, conductivity and corrosion is disclosed and applied to determine the effectiveness of a treatment regime in inhibiting corrosion and fouling in fluid systems, such as cooling water. Since corrosion may decrease the economic life of equipment in the cooling system and fouling may reduce the efficiency of heat resection from plant processes to the cooling medium, it is very important to keep these under control.

Traditional control of open recycling cooling systems typically includes the use of a single loop controller for controlling the pH with either an acid, such as sulfuric acid, or a base, such as a solution of caustic soda. A single loop controller may be included for controlling the level of dissolved solids in the cooling medium. Such dissolved solids may be measured by specific conductivity, and may be increased or decreased via adjusting a blowdown, or bleed off valve. Increasing the rate of bleed off causes the dissolved solids in the cooling medium to decrease. Some type of feed control for treatment chemicals may also be utilized for controlling the characteristics of cooling systems. Calendar date and time combined with an interval timer function are commonly utilized in control of systems and, in particular, for adding various types of microbicides.

Control of pH and conductivity typically utilizes feedback control technology. Feedback control may provide either analog or digital outputs to operating equipment such as pumps and valves. Analog outputs may go through Proportional Integral Derivative (PID) controllers for more precise control. Make-up medium flow rate, the flow rate of cooling medium added to the system compensate for medium lost to evaporation and other losses, such as windage and blowdown, is typically the basic control parameter for feed of treatment chemicals such as inhibitors and dispersants. In a cooling system, and an aqueous cooling system in particular, the make-up medium may be water supplied from at least one source, such as potable municipal water, well water, reclaimed process water, externally treated water, and condensate. Another commonly used, but less precise, method is to use the blowdown medium flow rate, which requires an assumption that other liquid losses may be either fixed or proportional to blowdown. A third means is called "bleed and feed", which proportions the addition of treatment materials to the time that an on/off, for example, a solenoid, bleedoff or blowdown valve is actuated.

Linear Polarization Resistance (LPR) technology has been used for three decades to monitor corrosion rates on-line. This technology is marketed as a "CORRATER" monitor by Rohrback Cosasco Systems, Inc. The analog signals provided by the CORRATER monitor are proportional to the "instantaneous" corrosion rate or the "instantaneous" corrosion imbalance. In fact, the CORRATER monitors determine the LPR over a period of time that may be as little as about 2 minutes or as long as about 20 minutes. Thus "Instantaneous" is a relative term when compared with off-line techniques, which may require about 30 to about 90 days of coupon exposure and as compared to on-line electrical resistance techniques, which may require about 2 to about 30 days.

Fouling Factor (FF) is a recognized engineering unit of measure. The FF results from the deposition of foulants on a heat transfer surface. The P-U-L-S-E analyzer, available from Ashland Chemical, Drew Industrial Division, provides the ability to determine the FF. The ONGUARD CFM-1000 monitor, also available from Ashland Chemical, Drew Industrial Division, determines a Fouling Index (FI). Research has proven that FI and FF have identical trends, yet they are numerically different and are computed in different manners.

Known methods of monitoring characteristics of cooling systems and controlling parameters of the systems may be of three types. The first type of known methods includes those that have traditionally lent themselves to automated feedback control of certain parameters, such as pH for the control of acid or caustic feed and conductivity for the control of bleedoff or blowdown.

The second type are those that detect the residual of a specific component in the treatment chemistry where such can be adequately measured in such a stream of the cooling medium. There are two known approaches to this type of monitoring. The first approach includes detecting a single active component, while the second type of detecting includes detecting an inert material that acts as a tracer.

Phosphate monitors are examples of the first approach to detecting since they detect only a single species of phosphorous ion, orthophoschate, in the cooling water system. In fact, the treatment chemistry may include several different phosphorous bearing materials together with various polymers, aromatic azoles and other constituents.

In the presence of calcium, magnesium, ferrous and ferric ions, orthophosphates have limited solubility. The limited solubility is a complex function of pH, temperature, residence time, and ionic concentration. In some systems, the solubility of such materials under operating temperatures and pressures may be close to the desired control limits making it difficult to differentiate between an excessive feed and conditions that may lead to deposition and, ultimately, to under deposit corrosion, which, in addition, leads to control windup.

Use of an inert trace compound that, unlike the active materials, can be detected in the stream of the cooling medium has its own shortcomings because it may only tell the user how much trace material is in the system. It may be unable to determine the efficacy of the treatment. For example, a treatment material, such as active constituents in a corrosion inhibiting composition, typically are consumed by reaction(s) in the process of inhibiting corrosion, or whatever process they are directed to inhibiting. The remaining treatment material is that portion that the reaction(s) do not consume and/or residual portion(s) that are required to sustain the involved reaction(s) by driving them to completion. Inert material(s), on the other hand, pass through the system without reacting with anything. This dependence on trace components does not assure the maintenance of active components within the desired control limits to assure that the performance benefits of said active components are derived. The above discussion may apply to any treatment material.

Other monitoring techniques include off-line monitoring such as complete chemical and microbiological analysis of the circulating water and analysis of corrosion coupons.

Many automated chemical feed systems utilize closed loop feed forward logic. These approaches use measured variables such as flow rate changes and changes in pressure, such as a pressure drop. The chemical feed quantities are adjusted through mass balance based algorithms associated with these measured variables. Further improvements were made in the accuracy of the mass balance algorithms by utilizing secondary measurements of conductivity and pH. However, these chemical feed systems only assured chemical mass loading maintenance within the system and did not take into account losses of the additives due to reactive consumption, precipitation or adsorption.

Other technologies were developed to feed chemicals based upon detection of quantifiable traceable entities associated with the chemical fed. While this approach alone ensured chemical quantity presence over the preceding method or in conjunction with preceding method whereby the method was utilized as a feed back trim. Approaches to date have not ensured the maintenance of key performance variables. For example, the key performance variables in cooling water systems are corrosion and fouling.

The minimization of the degree of corrosion and fouling in cooling waters are dependent upon the site-specific make up water characteristics, system design and operational criteria. As a result, a plurality of chemicals may be required to maintain a cooling system's corrosion and fouling control. Chemicals such as and not limited to ferrous and non-ferrous corrosion inhibitors, scale control agents, dispersants for inorganic and organic foulants, oxidizing and non-oxidizing biocides, biodispersants as well as specialized contingency chemicals to handle chemistry upsets due to process side ingressors. Should all these additives contain a tagged tracer to the active ingredient(s) or an inert tracer proportional concentration of the active ingredient(s), they could be separated individually for quantification as to the amount of each present in the system water utilizing on-line monitoring techniques, such as calorimetric, U.V., fluromatic, among others.

However, with such feed back trims in place, there still exists a lack of linkage of chemical(s) addition to the key performance variables, which are impacted by the chemicals. Examples of such systems include the system disclosed by Canadian Patent 2,055,098, U.S. Pat. Nos. 5,006,311, 4,992,380 and 4,783,314, which illustrate the process of detection of tracer tagged additives. These online detection methods then permit an increased, below specification, or decrease, above specification, in dosing rates of the detected additive. Should the additive be depleted from process inleakage or sludge adsorption for example, then continuous overfeed of the additive would occur. The residual loss and/or maintenance are not deriving any key performance value as it is not part of additive's designed intended use. Thus, control wind up results in an uneconomical consumption of the additive which in fact could impact the key performance variables negatively, such as increased fouling and/or corrosion.

Another example of such a system is disclosed by Rohm and Haas Company of Philadelphia, Pa., who have refined the traced tagged polymer approach as outlined in their literature from 18358B, Bulletin FC415. The method revealed therein indicates that free/unreacted polymer rather than total polymer can be detected by laboratory bench testing means. Unfortunately, this too can lead to control wind up whereby if system operational design or process inleakage occurs, the corrosion inhibitor, phosphate, will be lost in heat exchanger surface deposition, necessitating increased phosphate and tagged polymer addition. Not only is fouling increased but also underdeposit corrosion is initiated. This method again is not linked to key performance parameters of the system being treated. Only the economics associated to overfeed are reduced slightly over the previous citing and at present the method cannot be performed on-line and coupled to automatic chemical feeding as the former.

Yet another system is disclosed by U.S. Pat. Nos. 4,966,711 and 5,200,106, which teach the use of inert transition metals for tracers. These tracers are added in proportion to a chemical additive package. Should the additive(s) be consumed or lost due to coprecipitation or adsorption fouling then the tracer would indicate sufficient additive is present when in fact the opposite is true. This then results in control wind down. Corrosion protection can then be compromised. The key performance parameters of the system are not addressed.

Ion selective electrodes can and have been utilized to detect both inert tracers and corrosion inhibitors, such as phosphate. Inert tracer detection can lead to control wind down, while corrosion inhibitor detection of say phosphate can lead to control wind ups as previously mentioned.

U.S. Pat. No. 5,272,346 disclosed that certain corrosion control additives which are sensitive to U.V. absorbtion, such as imidazoline and pyridine derivatives, can be monitored on-line. However, no attempt in correlating the key performance parameter of corrosion rate determination and the impacted detectable amounts of the corrosion control additive have been disclosed. Should the relationship be established, again there is no assurance that an increase or decrease in additive concentrations would produce the desired result of improvements in the corrosion control as other foulants or conditions may be impacting the on-line corrosion rate being monitored.

Utilization of traced non-oxidizing biocides has also been proposed by Cooling Tower Institute of Houston, Tex., Cooling Tower Water Chemistry Paper T.P. 95-16. This approach allows the user to ensure that a residual amount of biocide additive in the system water over the period of desired contact time is correct. It does not relate to the control of the microbiological population, such as efficacious kill rates, and more importantly is not related to the detection and mitigation of biological fouling or microbiological influenced corrosion, Again, the key performance parameters are not addressed, which are, in fact, related to the need and use of the biocidal additives if smart logic can be used for the on-line identification of the use need.

The above discussion reveals that such approaches, at best, may permit a user to cross check chemical feed(s) based on mass balance, feed forward, and trim the specified amounts based on the on-line detection of the actives, feedback. This may allow for the potential of chemical inventory and economic control in a dynamic perfect system. Under upset or loss conditions, there is a potential for poor economics.

According to one analysis, the approximate operating costs of a cooling system, excluding downtime opportunity costs, may be broken down as follows:

| Cost Category | Percentage of Total Operating Costs |
| --- | --- |
| Electricity | 59 |
| Equipment Depreciation | 17 |
| Labor | 14 |
| Maintenance | 5 |
| Water Sewerage | 3 |
| Water Treatment Management | 2 |

The above-discussed approaches may impact the water treatment management portion and allow a user some ability to optimize the 2% of the cooling system cost. However, without linkage to the key performance parameters the remaining 98% of the operating costs cannot be effectively impacted. It is also well known that ineffective water treatment can lead to an increased operating cost of 4 to 5 times the cost of effective water treatment in simple refrigeration cycle cooling systems. Clearly, there is a need for a control system, which is linked to site specific key performance parameters through smart logic.

SUMMARY OF THE INVENTION

The effects of make-up coolant flow, contaminants in cooling systems and ingressors may not be directly measured or their effects directly predicted. However, the inventors of the present invention have discovered that accumulated effects of the above problems may be indirectly measured through measuring at least one of a variety of factors. The present invention relates to a method and apparatus that provides direct real time links between selected parameters and mechanical operations of an aqueous system. The parameters may include performance indicators and controlled variables related to the cooling system.

In accordance with its objects and advantages, aspects of she present invention provide a method for monitoring and controlling an aqueous system. The method includes measuring corrosion rate. If corrosion rate does not change then fouling factor is measured. If fouling factor or fouling index does not change then the method is started again by measuring corrosion rate. If fouling factor deviates from a set point then a material stepwise added to the cooling system to adjust fouling factor to the set point, the pH is measured, a material is added to the cooling system to adjust pH if pH deviates from a set point, and the method is started again by measuring corrosion rate. If corrosion rate decreases, oxidation-reduction potential is measured. If oxidation-reduction potential does not change then the feed rate of a corrosion inhibitor is reduced and the method is started again by measuring corrosion rate. On the other hand, if oxidation-reduction potential decreases then fouling factor is measured. If a change in fouling factor is detected then the rate of change is determined. Feed of treatment materials affecting oxidation-reduction potential and fouling is controlled until desired levels are obtained, then the method is started again by measuring corrosion rate. If a change in fouling factor is not detected then a feed rate of a halogen into the cooling system is increased, and then oxidation-reduction potential is measured again. If oxidation-reduction potential is at a setpoint then the method is started again by measuring corrosion rate. If oxidation-reduction potential deviates from a setpoint then the step of controlling feeding of treatment materials affecting oxidation-reduction potential is returned to. If corrosion rate increases then instability in the corrosion rate is measured. However, if instability is not detected, then pH is measured and a material is added to the cooling system to adjust pH if pH deviates from a set point, a feed rate of corrosion inhibitor is increased, and the method is started again by measuring corrosion rate. If instability is detected then fouling factor is measured. If fouling is not detected pH is measured and a material is added to the cooling system to adjust pH if pH deviates from a set point, feed rate of corrosion inhibitor is increased, and it is determined whether instability remains in the corrosion measurements. If no instability is detected then the method is started again by measuring corrosion rate. If instability is detected then material is added to the system to control fouling until fouling reaches a setpoint then it is determined whether instability remains in the corrosion measurements. If instability is not detected then the method is started again by measuring corrosion rate. However, if instability is detected then the step addressing when fouling is not detected is implemented. A pH check and adjustment(s) may be made and/or repassivation initiated. If fouling is detected then it is determined whether fouling factor or corrosion rate first deviated from a setpoint. If corrosion first deviated from a setpoint, then go to back to the step addressing the situation when fouling is not detected. On the other hand, if fouling factor first deviated from a setpoint then at least one action is taken including adding material to the cooling system to reduce fouling and adjusting operating parameters of the cooling system then the method is started again by measuring corrosion rate.

Other aspects of the present invention provide a method for monitoring and controlling a material within an aqueous system. The method includes altering a controllable variable of the cooling system a first amount and in a first direction. A parameter in the cooling system is monitored to detect a change in the parameter caused by the alteration of the controllable variable over a first time period. The controllable variable is again altered the first amount in the first direction if the parameter changes over the first time period. Alteration of the controllable variable is terminated when the parameter ceases to change after alteration of the controllable variable. The parameter is continuously monitored until a change is detected in the parameter over a second time period. A setpoint for the controllable variable is determined. The controllable variable is altered in a second direction opposite to the first direction in the first amount. The parameter is monitored to detect a change in the parameter caused by the alteration of the controllable variable in the second direction over a third time period. The controllable variable is again altered the first amount in the second direction if the parameter changes over the third time period until the setpoint is reached.

Still other objects and advantages of the present invention will become readily apparent by those skilled in the art from the following detailed description, wherein it is shown and described only the preferred embodiments of the invention, simply by way of illustration of the best mode contemplated of carrying out the invention. As will be realized, the invention is capable of other and different embodiments, and its several details are capable of modifications in various obvious respects, without departing from the invention. Accordingly, the drawings and description are to be regarded as illustrative in nature and not as restrictive.

BRIEF DESCRIPTION OF THE DRAWINGS

The above-mentioned objects and advantages of the present invention will be more clearly understood when considered in conjunction with the accompanying drawings, in which:

FIG. 4 represents a schematic view of an example of a cooling tower system that the present invention may be utilized with;

DETAILED DESCRIPTION OF THE INVENTION

Figure 1:
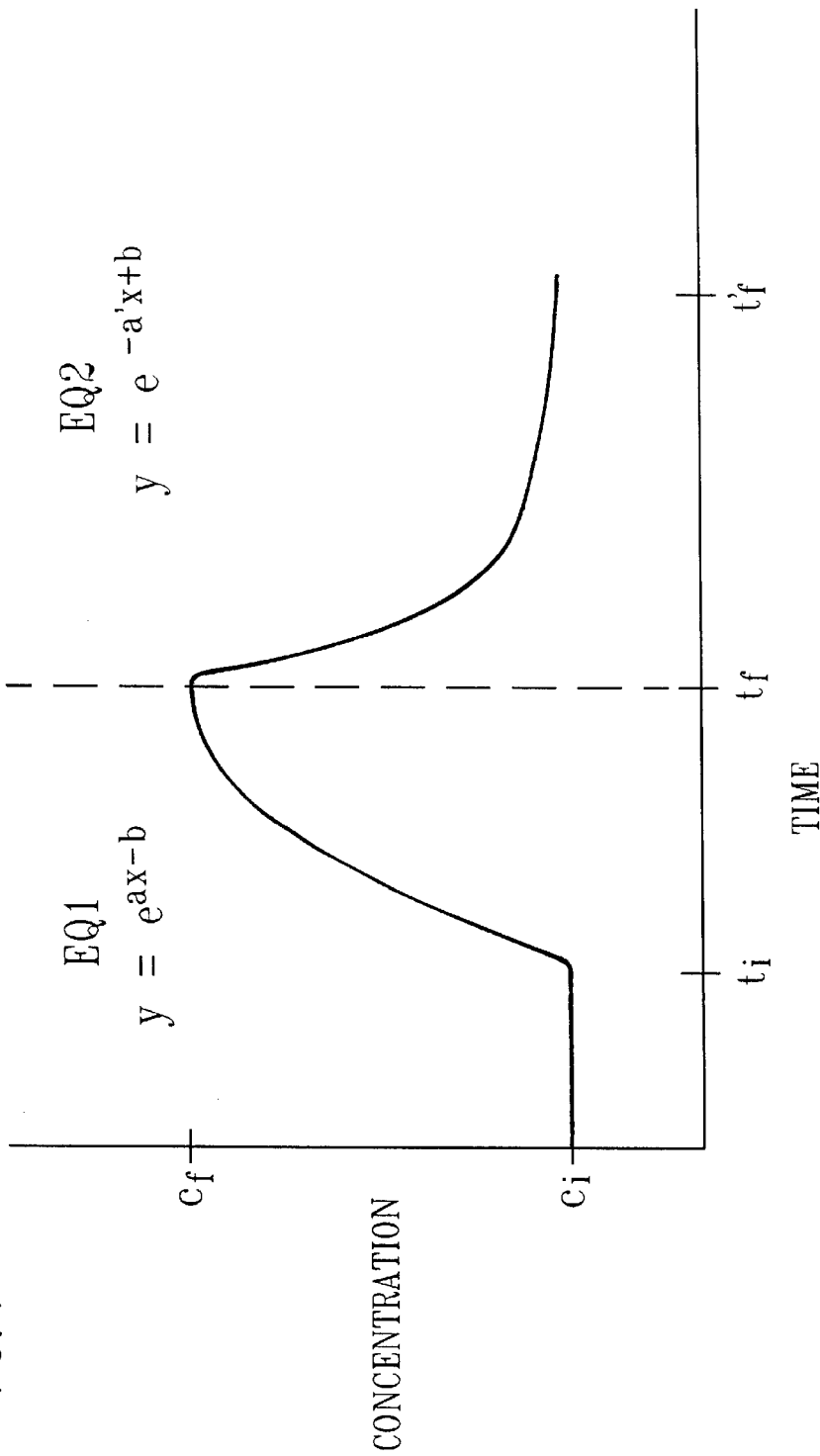
FIG. 1 represents a graph that illustrates a relationship between concentration of a material in an aqueous system with respect to time.
Figure 2:
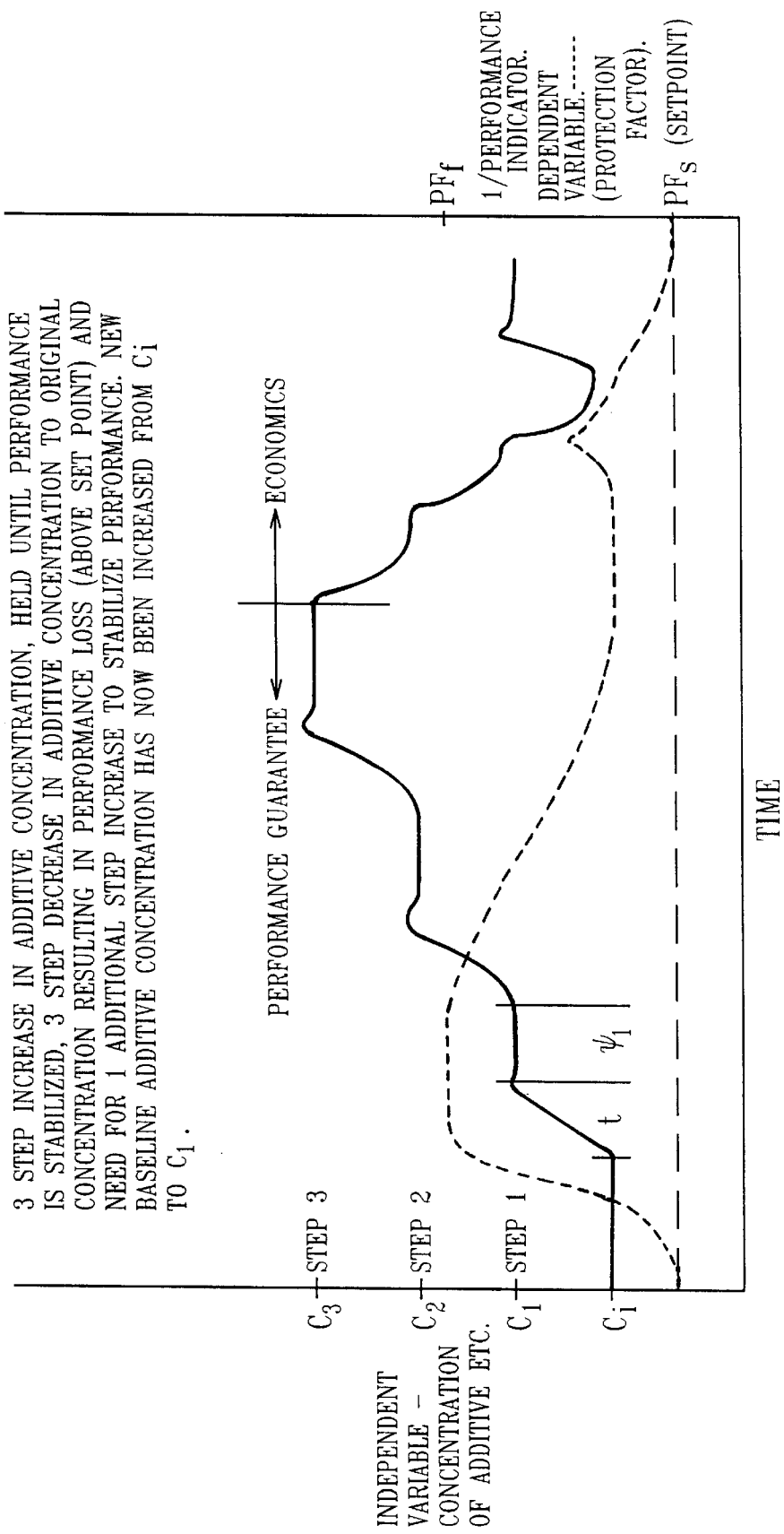
FIG. 2 represents a graph that illustrates a relationship between an independent variable concentration of a material in an aqueous system with respect to time and the effects of an embodiment of a step-wise control system according to the present invention.

The present invention provides a novel closed-loop performance-based control system. This present invention is related to co-pending U.S. patent application Ser. No. 08/610,146, filed Feb. 29, 1996, for Performance-Based Control System, the entire contents of the disclosure of which is hereby incorporated by reference. While co-pending application Ser. No. 08/610,146 made great strides in the control of cooling systems, the present invention furthers the previous system by providing a direct, real-time link between one or more performance Indicators and at least one controlled variable. As such, the present invention integrates the performance indicators into the control system. The present invention also provides algorithms that serve as the basis for automated control of systems by linking changes In the performance indicators on a real time basis into control system.

Co-pending U.S. patent application Ser. No. 08/610,146, filed Feb. 29, 1996, by George F. Hays and John M. Haaland, the entire contents of the disclosure of which is hereby incorporated by reference discloses a performance based control system utilizing continuous fouling and corrosion on-line measurements as open loop cascade control technology. This method exhibits superior key performance variable, such as fouling and corrosion, control maintenance over the above-discussed methods, provided the increased fouling is inorganic in nature and the increased corrosion is derived from corrosion inhibitor concentration variations. Since the effects of make up contaminants and ingressors can neither be directly measured nor their efforts be directly predicted, the accumulated effects of the preceding on the key performance instantaneous/monitoring of corrosion, fouling, pH and ORP. Measurement data can be compared to baseline conditions and the effects, indirectly predicted. These predictions provide real time links between the measured key performance indicators and controlled variables such as treatment chemistry, fluid make up, fluid volume, operating temperatures, mechanical operations such as filter backwash, various methods for on-line cleaning of heat exchangers, thermal bypasses, booster pumps, among other variables.

The present invention utilizes the predictive logic applied to a closed feedback-trimming loop of chemical selection, addition frequency and amount metered to maintain the desired key performance indicators within desired specifications. Desired specification herein includes control of corrosion and fouling to specified limits, which are selected by the user to match both system design and operational characteristics, balance the economics associated with the cost of the system operation and any lost cost opportunities associated with downtime.

According to one example, they may be defines as follows:

| | | |
|---|---|---|
| Fouling Allowance | 0.001 hr · ft$^2$ · °F./Btu | |
| or | 100 hr · ft$^2$ · °F./Btu × 10$^{-5}$ | |
| Corrosion Allowance | Mild Steel | 2 mpy or less |
| | Admiralty Brass | 0.3 mpy or less |
| Conditions | No pitting or underdeposit corrosion | |

The teachings of Noyes Publications Text, *Fouling of Heat Exchangers, Characteristics, Cost, Prevention, Control and Removal*, (© 1985, ISBN: 0-8155-1016-0) Chapter 2, Overview of Fouling, the entire contents of the disclosure of which is hereby incorporated by reference, outlines the Conditions of Fouling that are duplicated by Ashland Inc.'s P-U-L-S-E technology and the Types of Fouling that can be reasoned into separation logic for its detection and mitigation with the current invention.

When dealing with open evaporative cooling systems, there are two categories of concern typically associated with water quality, namely, corrosion and fouling. The present invention identifies in these two categories three subsets of indicators for identification through separation logic techniques. The instantaneous monitor trends are the basis for separation and identification of the independent variable stepwise adjustment outputs.

The following properties and relationships have been discovered to exist:

I. Corrosion
   a) General corrosion may be tied to the corrosion inhibitor concentration and pH present in the operating system water.
   b) Pitting corrosion again may be, tied to the previous conditions (a) in a more aggressive manner whereby prefilming or refilming is required. It may also lead or be the precursor to under deposit corrosion and corrosion product fouling.
   c) Under deposit corrosion may be tied to the previous conditions (b) but an advancement of condition b or biological fouling.

II. Fouling
   a) Inorganic fouling may be either particulate in nature, which has no time delay when monitoring, or crystallization in nature, which does have a time delay when monitoring. Particulate fouling can lead to under deposit corrosion and, hence, instability in the instantaneous corrosion monitor data.
   b) Organic fouling may have no time delay when monitoring and occurs when the other specific monitoring variables such as Total Organic Carbon or chemical oxygen demand increase, oxidation reduction potentials decrease and corrosion rates decrease with a potential for corrosion rate instability presence.

c) Biofouling may have a time delay associated with an initial increase in corrosion rate followed by instability in the corrosion measurements as the general corrosion rates begin to fall. This delay time may be short compared to true corrosion product fouling and the onset of fouling can initially produce negative heat transfer resistance, that is fouling factors, depending upon the fouling monitor metallurgy roughness factor.

From the above, it has been deduced that:

1. General corrosion and inorganic crystallization fouling can be the simplest forms to separate since they appear to be independent of each other.
2. Pitting and non-inorganic fouling should be avoided since they have an interdependency relationship.
3. Pitting can lead to;
    i) under deposit corrosion
    ii) microbiological influenced corrosion, which can lead to under deposit corrosion (NACE Corrosion/95, Paper 201).
    iii) microbiological influenced corrosion, which can lead to pitting, which can lead to under deposit corrosion.
4. Microbiologically influenced corrosion can lead to inorganic entrapment fouling inclusions.
5. Organic fouling can lead to inorganic entrapment fouling inclusions.
6. Organic fouling can lead to microbiologically influenced corrosion, which can lead to inorganic entrapment fouling inclusions.
7. Pitting corrosion can lead to microbiologically influenced corrosion and inorganic entrapment fouling inclusions. This is due to hydrogen uptake by bacteria at the cathodic site of the corrosion cell.
8. Inorganic particulate fouling can lead to under deposit corrosion, which may induce microbiologically influenced corrosion.

According to the present invention, points, or caveats, 1 through 8 discussed above are addressed through smart logic, or artificial intelligence. The logic can identify the cause for the key performance parameter change from the specified set point through input feed back from linear polarization, fouling. monitor, pH and/or ORP instrumentation installed on the recirculatory water system. It may then select the appropriate additive or operational change and verify the improvement via a time function, equation 4 below.

When the key performance variable change is less time, t, as defined by equation 3, which is site specific, it is also determined that the upset is externally derived from the dynamic system. Examples of externally induced upsets include, for example, change from performance variable set point, are a change in make up water chemistry, atmospheric, for example, airborne, contamination or process inleakage contamination.

According to the present invention, the economics of the upsets can also be evaluated in real time. Data can be logged in separate files during the alarmed upset whereby the performance variables are maintained at the specified set points and the associated chemical inventories consumed to achieve this are itemized. This data can then be used to evaluate the upcharged cost compared to process throughput reduction, labor, parts, and downtime opportunity cost potentials. Such analysis can then be used to determine if a relaxation in the specified set points of the key performance parameters would provide further economic benefit.

Any performance indicator may be utilized according to the present invention. For example, the performance indicators can include fouling, corrosion, and oxidation-reduction potential. Among the controlled, or controllable, variables that may be utilized are treatment chemistries, such as feed rates of acid, caustic, corrosion inhibitor, dispersant, oxidizing microbicide, and non-oxidizing microbicide. The controllable variables may also include blowdown rate, side stream filter backwash, make-up flow, fluid volume, operating temperatures, and/or mechanical operations, such as filter backwash and methods for on-line cleaning of heat exchangers, thermal bypasses, booster pumps, among other elements of the system.

The present invention may be utilized with a variety of systems, not limited to cooling systems. For example, the present invention may be utilized with any aqueous system to monitor and control water quality. Among the systems that the present invention may be utilized with are mine waters, waste waters, pulp streams, paper streams, deep well injection, and geothermal processes. The present invention may be utilized with closed loop and feedback control systems.

By interrelating performance indicators, controlled variables, and mechanical operations, the present invention raises monitoring and control to a new level. Monitored changes in variables are utilized to monitor for undesired movements in performance indicators and can then be utilized to trigger a variety of actions.

The dynamic response of open recirculating water systems may be characterized by the following equations:

$$y = e^{ax-b} \quad (1)$$

$$y' = e^{-a'x+b} \quad (2)$$

where, y represents a concentration of a measured inert material added to the system at a constant proportion to makeup;

y' represents a concentration of a measured inert material when no further addition is made to the system;

x represents time;

b represents a base line measured variable;

a represents a constant derived from a statistical curve fit of y versus t when y increases;

a' represents a constant derived from a statistical curve fit of y versus t when y' decreases.

Aqueous systems may further be characterized by the following equation:

$$t = (V/l) Ln(C_f/C_i) \quad (3)$$

where, t represents an initial response time of the aqueous system to changes in a variable;

l represents liquid losses, such as through blowdown and drift, which are equivalent to makeup/cycle;

V represents system volume;

$C_f$ represents final concentration of the measured inert material; and $C_i$ represents initial concentration of the measured inert material.

Additionally, aqueous systems may be characterized by the following equation:

$$t' = t + \Psi \qquad (4)$$

where,

Ψ represents a period expected for a performance variable to respond to a change made in the aqueous system; and t' represents time expected to obtain full response to the change in the aqueous system.

According to equation 4, Ψ is characteristic of the variable to be controlled and the system dynamics which are defined, for a specific system, by equations 1, 2 and 3.

Thus, a measurable inert substance may be used to characterize the dynamics of any open recirculating water system by first adding the substance at a constant proportion to makeup, while measuring said variable against time until the concentration ceases to change significantly. Concentration. versus time is then plotted and equation 1 is used to curve fit, thus determining a. The addition of the inert substance is then terminated and its concentration is then measured and plotted against time. Equation 2 is then used to curve fit, thus determining a'.

If, after a period of time, t', the control system is unable to maintain the desired performance setpoint, then additional change may be made until the performance variable matches the desired setpoint. Once this is achieved, the controlled parameter is held constant for one t'. Thereafter, the parameter is "tested" by incrementally reducing the dosage level at the same numerical rate as the increase was made, until such time as the setpoint is no longer achievable. This information is then stored. The incremental step factor may be decreased, such as by halving it, and then the controlled parameter may be increased until the setpoint is reestablished. This process may be continued until steady state is reached.

A change in a performance variable that occurs in a period of less than a time period t, may indicate that an externally derived influence on the system has occurred. Such external influences can include makeup chemistry, contamination or ingressors. Under such conditions, a system may react by maximizing incremental adjustments of controlled parameters until such time as the performance variables return to their setpoints. Thereafter, the previously described reduction in rate of change is reinstituted until steady-state is reached.

To provide an automatic monitoring and regulating, the present invention also includes an automatic control that implements the above logic. The artificial intelligence system according to the present invention applies chemical addition control based upon the performance monitors. While the exact make-up and sequence of the steps involved may vary, depending upon the embodiment, an example is described below.

EXAMPLE 1

According to this example, the logic may initially begin with a feed forward mass balance. The feed forward mass balance may be corrected to actual cycles present. The system response may then be reviewed and adjustments made. As stated above, the response of the system to addition of one additive may be looked at here.

In feed forward mass balance, review, and adjustment, if the additive's concentration in the system is low and the cycles are low, based upon evaluation of independent variables, then the cycles may be increased. Input data may then be assessed after the closed loop feed back is received from the performance monitors, for example, feedback from key performance indicators and dependent variables. After the assessment, decisions as to possible farther actions to be taken may be performed through an artficial intelligence decision tree. Output adjustments may then be made based upon the results of the decision tree. For example, a decision may result to initiate or terminate the feeding of a selected chemical additive.

When dealing with open evaporative cooling systems, there are typically two categories of concern, namely, corrosion and fouling. Of these two categories, three subsets of indicators typically need to be identified through separation logic techniques. The instantaneous monitor trends may serve as the basis for separation and identification or the independent variable step wise adjustment outputs.

Corrosion can take different forms. For example, general corrosion includes corrosion that is tied to the corrosion inhibitor concentration and pH present in the operating system water.

On the other hand, pitting corrosion may also be tied to corrosion inhibitor concentration and pH. However, pitting corrosion may take place in a more aggressive manner, whereby prefilming or refilming is required. Pitting corrosion may also lead to or may be the precursor of under deposit corrosion and corrosion product fouling.

A third form of corrosion, under deposit corrosion, may be tied to the same conditions that general and pitting corrosion are tied to. However, an advancement of condition under deposit corrosion may also be tied to advancing pitting corrosion and/or biological fouling.

With respect to fouling, a plurality of types of fouling exist. For example, inorganic fouling can be particulate or crystalline. Particulate fouling does not exhibit a time delay when monitoring. On the other hand, crystallization fouling does exhibit a time delay when monitoring. Additionally, particulate fouling can lead to under deposit corrosion and, hence, instability in the instantaneous corrosion monitor data, however crystallization does not.

Organic fouling represents a second type of fouling. Organic fouling typically does not include a time delay when monitoring. Organic fouling may occur when other specific monitoring variables, such as Total Organic Carbon or chemical oxygen demand, increase. On the other hand, organic fouling may also occur when other monitoring variables, such as oxidation-reduction potentials or corrosion rates, decrease. Decrease in these variables may be accompanied by a potential for corrosion rate instability presence.

Biofouling represents another category of fouling. Biofouling may have a time delay associated with an initial increase in corrosion rate followed by instability in the corrosion measurements, as the general corrosion rates begin to fall (see U.S. Pat. No. 5,576,481 to Beardwood et al., the entire contents of the disclosure of which is hereby incorporated by reference). This may then be followed by a net change in fouling factor or fouling index from baseline values. The associated delay time discussed may be short compared to true corrosion product fouling. The onset of fouling can initially produce negative heat transfer resistance, that is, fouling factors, depending upon the fouling monitor metallurgy roughness factor, and the phenomenon of initial random deposition, which locally increases turbulence and enhances heat transfer at the fluid/heat transfer surface boundary.

It can be deduced from the preceding that this form of fouling leads to localized corrosion, such as pitting or underdeposit corrosion. Pitting and non-inorganic fouling should be avoided since they are interdependent. General corrosion and inorganic crystallization fouling may be the simplest forms to separate since they are independent of each other.

It may also be deduced that pitting can lead to under deposit corrosion. Additionally, microbiologically influenced corrosion can lead to pitting, which can lead under deposit corrosion. Furthermore, microbiologically influenced corrosion can lead to accelerated pitting, which in turn, can lead to under deposit corrosion.

Additionally, it can be deduced from the preceding that microbiologically influenced corrosion can lead to inorganic entrapment fouling inclusions. Organic fouling may then lead to inorganic entrapment of foulant inclusions. Organic fouling can also lead to microbiologically influenced corrosion, which may then lead to inorganic entrapment fouling inclusions.

Furthermore, it can be deduced from the preceding that pitting corrosion can lead to microbiologically influenced corrosion and inorganic entrapment fouling inclusions. This may be due to hydrogen uptake by bacteria at the cathodic site of the corrosion cell. Inorganic particulate fouling can lead to under deposit corrosion, which may or may not induce microbiologically influenced corrosion.

Figure 3:
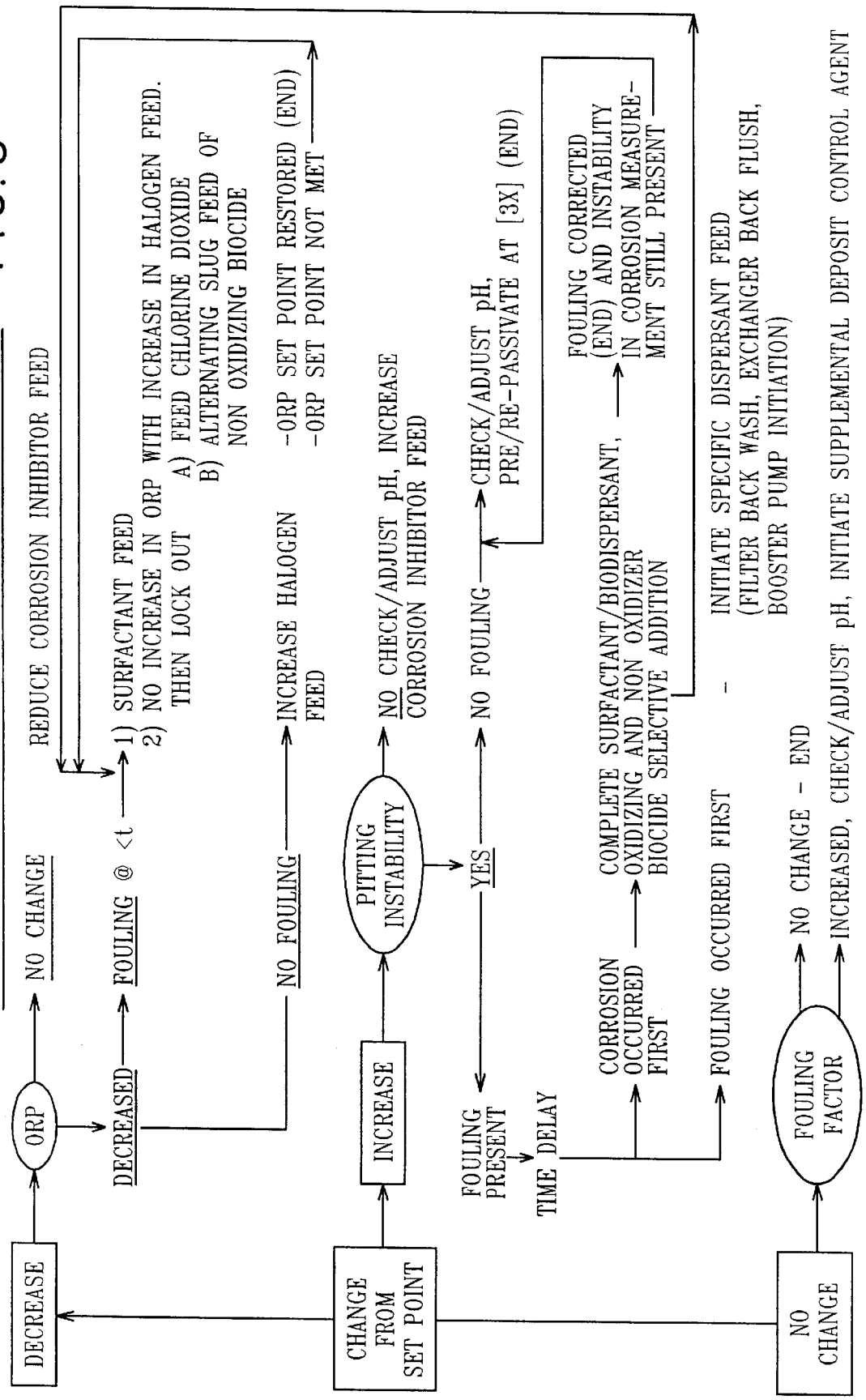
FIG. 3 represents a flow chart that illustrates an embodiment of a decision making process according to an the present invention.

The inventors of the present invention, after discovering the above and caveats, created a system of artificial intelligence that may include the decision tree, or flow chart, illustrated in FIG. 3. The decision tree may lead to the following decision making process for instantaneous system water measurements:

1) Corrosion rate changes from set point?
    i) Decreases, go to 2;
    ii) Increases, go to 8;
    iii) No change, go to 16;
2) ORP changes?
    i) No change from baseline, go to 3;
    ii) Decreases from baseline, go to 4;
3) Reduce corrosion inhibitor dosage in an incremental step wise fashion;
4) Fouling factor change?
    i) Yes, go to 5;
    ii) No, go to 7;
5) Fouling factor change less than t?
    i) Yes, alarm system inleakage, go to 6;
    ii) No, alarm make up organic check, go to 6;
6) a) Initiate or increase surfactant feed;
    b) Lock out halogen feed if dosing increases without restoration of ORP and initiate chlorine dioxide feed and alternating non oxidizing biocide slug feeds;
    c) ORP restored, halt non oxidizer and chlorine dioxide feed and resume halogen feed;
    d) Baseline fouling factors obtained, incrementally reduce surfactant feed in a step wise manner;
7) a) Increase halogen based oxidant feed and recheck ORP;
    i) ORP returns to set point by time t'; halogen based oxidant feed is correct; alarm, check make up water demand;
    ii) ORP does not return to set point by time t'; go to 6, alarm, check make up for organics;
8) Increased corrosion rate above baseline; instability in measurements present?
    i) No, go to 9;
    ii) Yes, go to 10 and 11;
9) Incrementally increase the corrosion inhibitor feedrate in a step wise Fashion until set point is satisfied;
10) Check system pH compared to baseline set point;
    i) lower than set point;
        a) reduce acid feed;
        b) increase alkali feed;
    ii) higher than set point;
        a) reduce alkali feed;
        b) increase acid feed;
11) Is fouling present?
    i) No, go to 12;
    ii) Yes, go to 13;
12) Prepassivate/Repassivate at three times the baseline corrosion inhibitor feed rate for a time period of time $t'_f - t_i$ as defined in FIG. 1; upon completion, if instability in corrosion measurements are still present, go to 15;
13) Does a time delay exist, whereby;
    i) fouling factor change from baseline (set point) values occurred first, go to 14;
    ii) corrosion increase above baseline (set point) values occurred first, go to 15;
14) Particulate fouling is present, alarm, check make up, backwash filters, back flush critical heat exchangers, booster pump initiation on recirculation system; initiate specific dispersant feed in an incremental step wise fashion; upon achieving baseline fouling factor set point, incrementally reduce the specific dispersant feed in a step wise fashion;
15) a) Initiate surfactant or biodispersant in an incremental step wise fashion;
    b) Initiate non oxidizing biocide slug feeds on an alternating basis;
    c) Once the fouling factors return to baseline (set point), non oxidizing biocide slug feed is stopped and the surfactant or biodispersant feed rates are incrementally reduced in a step wise fashion and eventually ceased, go to 16;
    d) If instability in the corrosion measurement are still present but the baseline setpoint corrosion rate is achieved then go to 12;
16) If fouling factors;
    i) have not changed, go to 18;
    ii) have increased, go to 17;
17) If the fouling factors increase above baseline set points then;
    i) go to 10 for pH check/adjustment;
    ii) initiate a supplemental deposit control agent fed in an incremental step wise fashion until the fouling factor set point is achieved;
    iii) once the set point fouling factor value is achieved, the supplemental deposit control feed is decreased in an incremental stepwise fashion, go to 18;
18) End.

In the above decision making process, all slug feeding of additives may be carried out on the basis of duration of feeding time defined as $t_f - t_i$ and frequency of feeding time defined as $t_f^1 - t_i$. Both time periods are specific for specific systems and are illustrated in FIG. 1.

It should also be noted that contingency plans can be built into the preceding logic in order to detect and compensate for ingressors and upsets, thus avoiding a loss of control of the performance variable set points.

EXAMPLE 2

Example 2 presents an analysis of a cooling tower system in which one or more intermittent water make-up streams are supplied to the system in addition to the main make-up stream. Frequently, various sources and types of water are available and are provided to cooling tower systems. Usually, there is a continuous major source of make-up water for the system and this water constitutes the main make-up stream. Other sources of make-up water may be available on an intermittent basis and, therefore, are provided intermittently. One intermittent stream may be provided or several intermittent streams may be provided simultaneously. These intermittent streams will in all likelihood be of different quality from each other as well as from the main make-up stream.

Example 2 may be utilized to develop feed forward control of blowdown and consistent control of cycles of concentration. Also, Example 2 compiles input data, which forms the basis upon which other algorithms may be utilized as feedback control.

This example provides an analysis of a cooling tower system in which there are one or more intermittent make-up streams provided to the system in addition to the main make-up water stream. A simple model of the system is proposed. A computer program is presented that has two options. One option is used to determine required blowdown flow rate so that there is no change in the cooling system concentration when the intermittent stream(s) flow into the system. With a second option, the quality of the water in the system can be determined as a function of time. Provision is made to vary the blowdown from the system in order to determine the effect of various blowdown rates.

Figure 4:
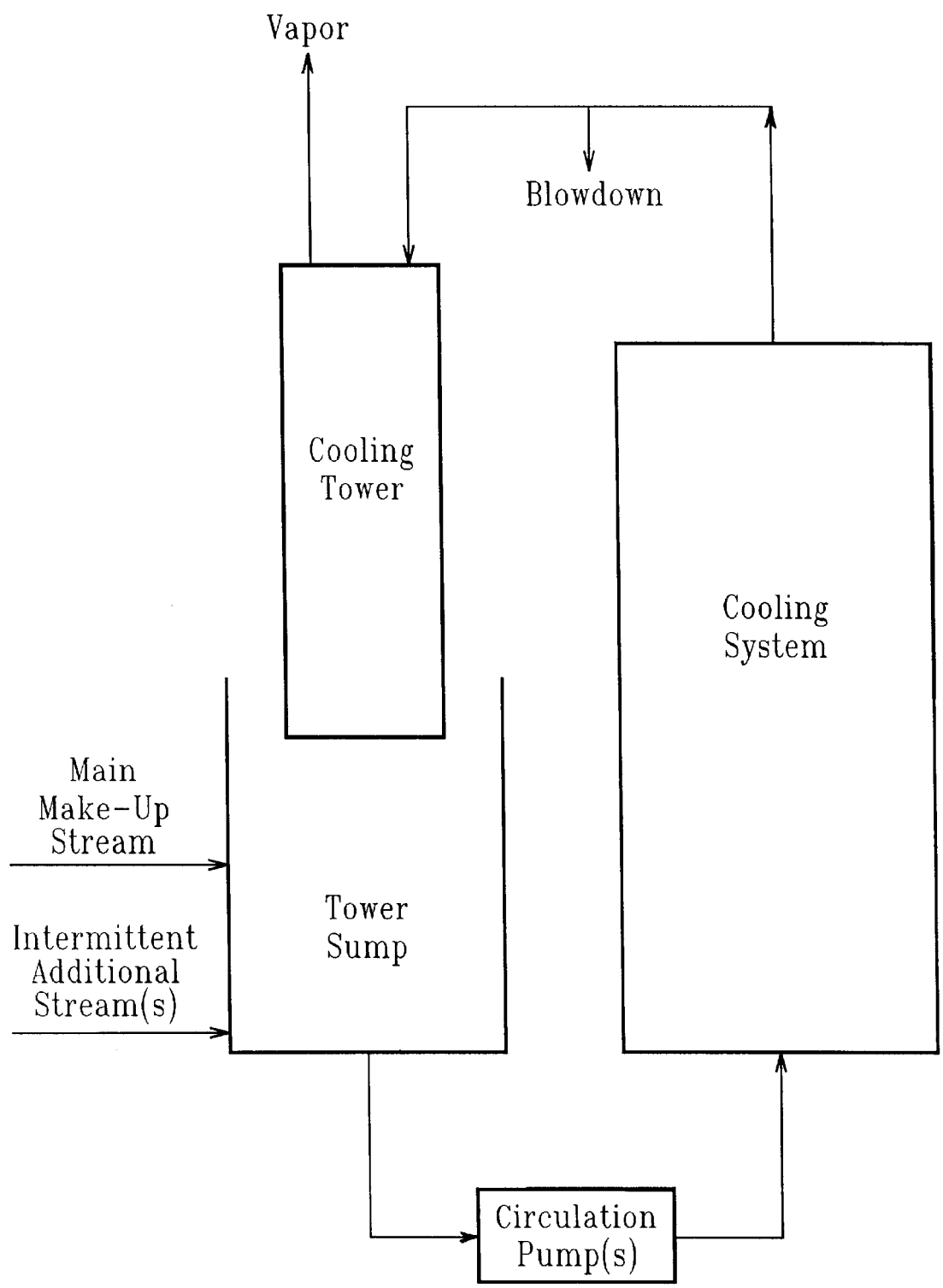

FIG. 4 represents a simple model of a portion of cooling system involved in this example. In particular FIG. 4 illustrates a cooling tower system. The system is supplied with a main make-up water supply. Intermittent additional stream (s) are provided periodically.

Figure 5:
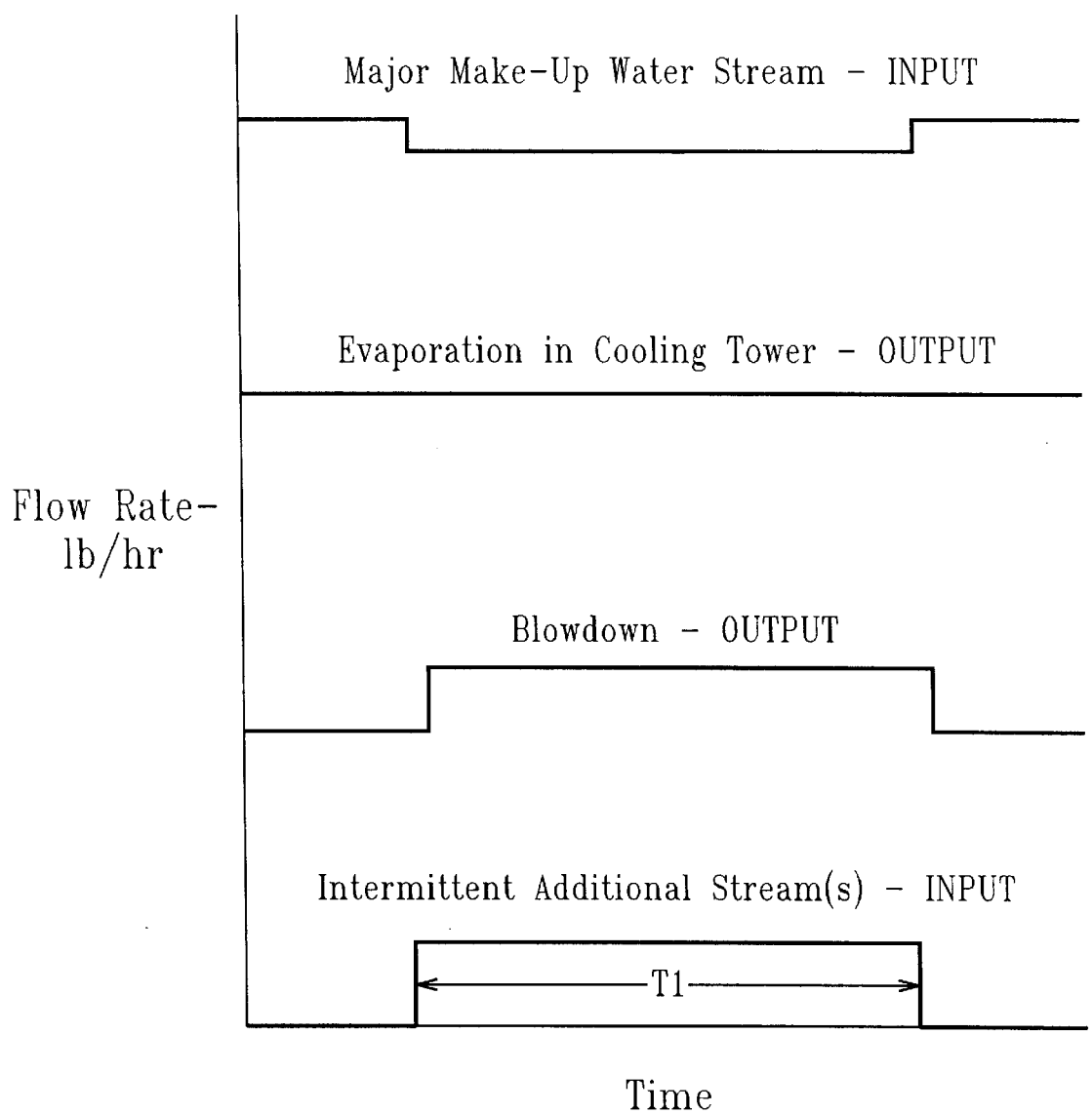
FIG. 5 represents a graph that illustrates flow rates of input streams flowing into and output streams flowing out of a cooling tower system with respect to time.

FIG. 5 schematically illustrates a rate of flow of input streams to the system and output streams from the system as a function of time. FIG. 5 shows that an intermittent stream or streams flow into the system for a period of time, $T_1$.

In this example, it is assumed that the system is in equilibrium before the start of the intermittent stream(s). It is also assumed that the rate of evaporation in the cooling tower remains constant during the time that the intermittent stream(s) are flowing. When the intermittent stream(s) start to flow into the system, the blowdown from the system may be adjusted to maintain the original water quality in the system. Likewise, the flow of the main make-up stream may be adjusted so that the constancy of the evaporation rate in the cooling tower is maintained. That is, flows may be adjusted so that the total water hold-up in the system remains constant.

The total amount of coolant, such as water, in a cooling system typically is maintained constant. One way to achieve this is to utilize the cooling tower basin level as the make-up control. This may be carried out by controlling the main make-up stream with a float valve. Streams other than the make-up stream are permitted to flow into the system at their available rate(s). If the other streams provide sufficient water, then the main make-up typically is not actuated. Also, multiple make-up streams typically have little or no effect on the evaporation rate or its consistency.

FIG. 5 also shows the streams entering and leaving the system. The evaporation in the cooling tower is assumed to be constant. When the intermittent streams start to flow into the system, the blowdown may be adjusted to maintain the quality of the water in the system. The flow of the main make-up stream may then be adjusted to satisfy the constancy of the evaporation rate.

Methodology of the Analysis of the System

The system may be analyzed by evaluating water and component balances around the whole system, as well as around the cooling tower sump. When the intermittent stream(s) start to flow into the system, it is assumed that the system is in equilibrium.

Option No. 1 of the computer program may be utilized to determine the required blowdown flow rate so that the water quality in the system remains unchanged when the intermittent stream(s) flow into the system.

Option No. 2 of the computer program may be utilized to determine the concentration as a function of time for various blowdown flow rates. For Option No. 2, the problem becomes an unsteady state problem and it is necessary to make the material balances over an infinitesimal time increment. This results in differential equations, the solution of which will give the water quality as a function of time both during and after the intermittent stream(s) flow into the system. The calculations will start at the time when the intermittent stream(s) begin flowing into the system. With Option No. 2 the result of the calculations will be to give the concentration of a key constituent in the water as a function of time.

Assumptions in the Calculations

This example includes certain assumptions to facilitate making the calculations involved. Along these lines, in order to conduct the analysis and provide relatively simple relationships for the solution of the problem, the following assumptions are made:

1. The cooling tower sump is completely mixed;
2. There is plug flow in the cooling system. That is, the time it takes for an element of fluid leaving the sump to return to the sump is the residence time of the coolant, such as water, in the cooling system; and
3. During the course of the calculation, it is assumed that the rate of evaporation in the cooling tower remains constant at its value at the beginning of flow of the intermittent stream(s) Hence, as the rate of flow of the intermittent stream(s) and the blowdown are varied, the flow rate of the main make-up stream is changed to maintain the evaporation rate existing at the beginning of the calculation, that is, water hold-up in the system is constant.

Information About the System

It is desired that the following information be known in order to accomplish the desired calculations. The component concentration referred to is that of a key water quality component such as hardness, total dissolved solids, silica, etc.

1. Rate of flow of main make-up stream at equilibrium;
2. The concentration of the main make-up stream;
3. Concentration of the water in the system at equilibrium;
4. Rate of flow of intermittent stream(s);
5. Concentration of intermittent stream(s);
6. Temperature of the water in the cooling tower sump;
7. Total volume of water in the cooling system;
8. Total volume of water in the cooling tower sump; and
9. Time of flow of intermittent stream(s).

While items 1–5 may be utilized in Option No. 1 of the computer program, all nine Items may be required for Option No. 2.

Important Variables

The following are variables that may be important to know in conducting the analysis of the cooling system in this example.

| | |
|---|---|
| CIS(n) | Concentration of the nth intermittent stream (n = 1, 2, 3, 4) (mg/l); |
| CIAS | Effective concentration of the combined intermittent streams (mg/l); |
| CMMU | Concentration of the main make-up stream (mg/l); |
| CSYS | Concentration of the cooling water in the sump (mg/l); |
| CSYSI | Initial concentration of the cooling water in the sump (mg/l); |
| MBDI | Initial mass flow rate of the blowdown (lb/hr); |
| MBD | Mass flow rate of the blowdown at time T (lb/hr); |
| MIS(n) | Mass flow rate of the nth intermittent stream (n = 1, 2, 3, 4) (lb/hr); |
| MIAS | Effective flow rate of the intermittent stream(s) (lb/hr); |
| MMMUI | Initial mass flow rate of main make-up stream (lb/hr); |
| MMMU | Mass flow rate of main make-up stream at time T (lb/hr); |
| MSYS | Mass flow rate in the cooling system (constant) (lb/hr); |
| $T_1$ | Duration of flow of the intermittent additional stream(s) (hr); |
| TSUMP | Temperature of the water in the cooling tower sump (F); |
| VSYS | Volume of the cooling system excluding the tower sump ($ft^3$); |
| VSUMP | Volume of water in the cooling tower sump ($ft^3$); |

MASS BALANCE EQUATIONS FOR COOLING TOWER SYSTEM WITH AN INTERMITTENT MAKE-UP STREAM(S)

The following represent various equations that may be utilized in this example.

General Mass Balance Equation

Input−Output=Accumulation

The following equations related to cases where the system is at equilibrium before intermittent stream(s) start to flow.

Overall Water Balance on Whole System

| | | |
|---|---|---|
| INPUT (main make-up stream) | = | MMMUI |
| OUTPUT (water vapor from cooling tower) | = | MVAP |
| TOTAL LIQUID LOSSES | = | MBDI |
| ACCUMULATION (at equilibrium) | = | 0 |
| Thus: MMAUI − MVAP − MBDI | = | 0 |

With respect to the "TOTAL LIQUID LOSSES", this value represents windage, uncontrolled liquid losses, and blowdown. Windage, or drift, represents moisture entrained in vapor (evaporation). Windage is a function of cooling tower design and is typically expressed as a percentage of circulation rate. Uncontrolled liquid losses can include pump seals and other such means. While windage and uncontrolled liquid losses are both uncontrollable, blowdown may be controllable. While uncontrolled liquid losses and windage may be relatively constant, blowdown is a valid means for controlling cycles of concentration of solids in circulating cooling water.

Overall Component Mass Balance on Whole System

| | | |
|---|---|---|
| INPUT (main make-up stream) | = | (MMMUI)(CMMU) |
| OUTPUT (blowdown stream) | = | (MBDI)(CSYS) |
| ACCUMULATION (at equilibrium) | = | 0 |
| Thus: (MMMUI)(CMMU) − (MBDI)(CSYS) | = | 0 |
| From which (MBDI) = (MMMUI)(CMMU)/(CSYS) | | |

CONSIDERATION OF INTERMITTENT STREAMS

Option No. 1. Determination of Blowdown Rate Required in Order to Maintain Constant Water Quality Given one intermittent or several simultaneous intermittent stream(s) flowing into the system, the flow rate of the blowdown should be determined so that there is no change in the water quality due to the intermittent stream(s) That is, the initial system concentration, CSYSI, is assumed to remain constant.

Water Balance on Whole System

| | | |
|---|---|---|
| INPUT (main make-up stream) | = | MMMU |
| INPUT (intermittent stream(s)) | = | MIAS |
| TOTAL LIQUID LOSSES | = | MBD |
| OUTPUT (vapor) | = | MVAP |
| ACCUMULATION (steady state) | = | 0 |
| Thus: MMMU + MIAS − MBD − MVAP | = | 0 |

Component Balance on Whole System

| | | |
|---|---|---|
| INPUT (main make-up stream) | = | (MMMU)(CMMU) |
| INPUT (intermittent stream(s)) | = | (MIAS)(CIAS) |
| TOTAL LIQUID LOSSES | = | (MBD)(CSYSI) |
| ACCUMULATION (steady state) | = | 0 |
| Thus: (MMMU)(CMMU) + (MIAS)(CIAS) − (MBD)(CSYSI) | = | 0 |

In equations (1) and (2) above, there are two unknowns, the rate of flow of the main make-up stream, MMMU, and the rate of flow of the blowdown, MBD. It is possible to solve for these two unknowns from these two equations. The results are as follows:

$$MBD=[MVAP +MIAS((CIAS/CMMU)-1)]/[(CSYSI/CMMU)-1] \quad (3)$$

$$MMMU=MVAP+MBD-MIAS \quad (4)$$

Equation (3) and Equation (4) above may be utilized to determine the blowdown flow rate and the main makeup stream flow rate so that there will be no change-in the concentration of the water in the system when the intermittent stream(s) start to flow.

Option No. 2. Determination of Concentration as a Function of Time While the Intermittent Stream(s) are Flowing into the System When the intermittent stream(s) start flowing into the system, if there is no change flow rate of the blowdown, the concentration of the system may vary with time. This may present an unsteady state problem and typically is analyzed using differential time elements.

Water Balance on Whole System at Time T

At the time that the intermittent stream(s) start flowing into the tower sump, the blowdown rate of flow may be changed so the rate of flow of the main make-up stream needs to also be changed to accommodate the constant vaporization rate that existed at equilibrium.

| | | |
|---|---|---|
| INPUT (main make-up stream) | = | MMMU |
| INPUT (intermittent stream(s)) | = | MIAS |
| TOTAL LIQUID LOSSES | = | MBD |
| OUTPUT (water vapor) (constant) | = | MVAP |
| ACCUMULATION (water hold-up is constant) | = | 0 |
| Thus: MMMU + MIAS − MBD − MVAP | = | 0 |

Component Balance on Cooling Tower Sump at Time T

Since conditions in the system typically are changing, the component balance is made over an increment of time dT.

CASE 1—TRES<T1

Figure 6:
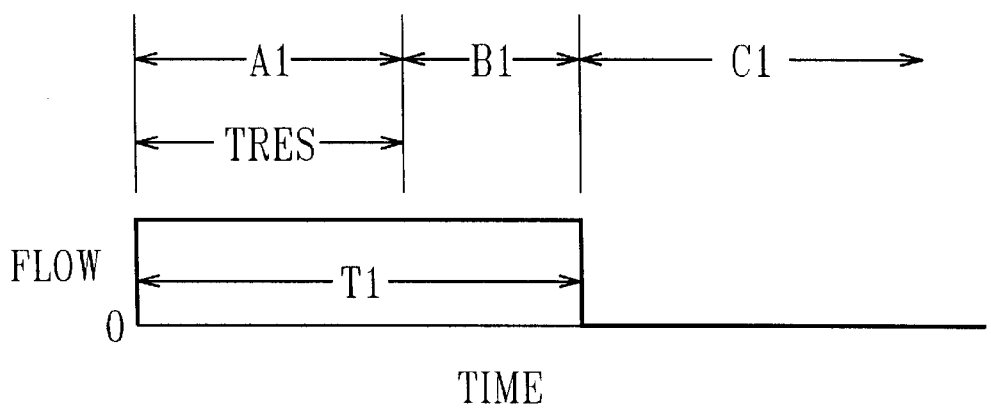
FIG. 6 represents a graph that illustrates flow of intermittent stream(s) and various time periods during which a process according to the present invention may be utilized to analyze.

Residence time, TRES, of water in cooling system is less than the duration of flow, $T_1$, of the intermittent stream(s) (See FIG. 6.

Calculation Zone A1 ($0 \leq T \leq TRES$)

Duration is from T=0 to T=TRES, and begins when the intermittent stream(s) start flowing into the sump. At this time, the flow rate of the main make-up stream is reduced to satisfy the condition of constant evaporation in the tower. Also, during this period, the concentration of the water resuming to the sump from the cooling system is the initial concentration that existed at equilibrium, CSYSI.

$$TRES=(VSYS)(RHO)/MSYS$$

| | | |
|---|---|---|
| INPUT (main make-up stream) | = | (MMMU)(CMMU)dT |
| INPUT (intermittent stream(s)) | = | (MIAS)(CIAS)dT |
| INPUT (cooling tower) | = | (MSYS − MBD)(CSYSI)dT |
| OUTPUT (cooling system) | = | (MSYS)(CSYS)dT |
| ACCUMULATION | = | (VSUMP)(RHO)dCSYS |

Combining the above equations and expressing in finite increment form results in $$(CSYS)_{T+\Delta T}=(CSYS)_T+[(MMMU)(CMMU)+(MIAS)(CIAS)+(MSYS-MBD)(CSYSI)-(MSYS)(CSYS)_T]\Delta T/[(VSUMP)(RHO)]$$

The above equation may be applied iteratively at each time increment starting from T=0 to obtain the value of CSYS as a function of time. It may be applied in Zone A1 from T=0 to T=TRES.

Calculation Zone B1 ($TRES \leq T \leq T_1$)

Duration of this calculation zone may be from T=TRES to T=$T_1$, that is, it ends when the intermittent stream(s) stop(s) flowing. After T=TRES, the concentration of the water entering the cooling tower is at the value it was when it left the sump one residence time previously, that is, $(CSYS)_{T-TRES}$.

| | | |
|---|---|---|
| INPUT (main make-up stream) | = | (MMMU)(CMMU)dT |
| INPUT (intermittent stream(s)) | = | (MIAS)(CIAS)dT |
| INPUT (cooling tower) | = | (MSYS − MBD)((CSYS)$_{T-TRES}$)dT |
| OUTPUT (cooling system) | = | (MSYS)(CSYS)dT |
| ACCUMULATION | = | (VSUMP)(RHO)dCSYS |

Combining the above equations and expressing in finite increment form results in $$(CSYS)_{T+\Delta T}=(CSYS)_T+[(MMMU)(CMMU)+(MIAS)(CIAS)+(MSYS-MBD)((CSYS)_{T-TRES})-(MSYS)(CSYS)_T]\Delta T/[(VSUMP)(RHO)]$$

The above equation may be applied iteratively at each time increment starting from T=TRES to obtain the value of CSYS as a function of time. The equation may be applied in Zone B1 from T=TRES to T=$T_1$.

Calculation Zone C1 ($T_1 \leq T$)

This calculation zone starts at T=$T_1$, that is, when the intermittent stream(s) stop flowing and the calculation continues as long as desired. When the intermittent stream(s) stop flowing the main make-up stream and the blowdown flow rates assume the value that they had at the beginning just before the intermittent stream(s) started flowing.

| | | |
|---|---|---|
| INPUT (main makeup stream) | = | (MMMUI)(CMMU)dT |
| INPUT (cooling tower) | = | (MSYS − MBDI)((CSYS)$_{T-TRES}$)dT |
| OUTPUT (cooling system) | = | (MSYS)(CSYS)dT |
| ACCUMULATION | = | (VSUMP)(RHO)dCSYS |

Combining the above formulas and expressing in finite increment form results in $$(CSYS)_{T+\Delta T}=(CSYS)_T+[(MMMUI)(CMMU)+(MSYS-MBDI)((CSYS)_{T-TRES})-(MSYS)(CSYS)_T]\Delta T/[(VSUMP)(RHO)]$$

The above equation may be applied iteratively at each time increment starting from T=$T_1$ to obtain the value of CSYS as a function of time. The calculation may continue as long as desired.

CASE 2—TRES>$T_1$

Residence time, TRES, of water in cooling system is greater than the duration of flow, $T_1$, of the intermittent stream. (See FIG. 7).

Calculation Zone A2 ($0 \leq T \leq T_1$)

Duration is from T=0 to T=$T_1$, that is, when the intermittent stream(s) start to flow into the sump to when the intermitted stream(s) stop flowing into the sump.

| | | |
|---|---|---|
| INPUT (main make-up stream) | = | (MMMU)(CMMU)dT |
| INPUT (intermittent stream(s)) | = | (MIAS)(CIAS)dT |
| INPUT (cooling tower) | = | (MSYS − MBD)(CSYSI)dT |
| OUTPUT (cooling system)) | = | (MSYS)(CSYS)dT |
| ACCUMULATION | = | (VSUMP)(RHO)dCSYS |

Combining the above equations and expressing in finite increment form results in $$(CSYS)_{T+\Delta T}=(CSYS)_T+[(MMMU)(CMMU)+(MIAS)(CIAS)+(MSYS-MBD)(CSYSI)-(MSYS)(CSYS)_T]\Delta T/[(VSUMP)(RHO)]$$

The above equation may be applied iteratively at each time increment starting from T=0 to obtain the value of CSYS as a function of time. The equation may be applied in Zone A2 from T=0 to T=$T_1$, the latter value being the time when the intermittent stream(s) stop flowing into the sump.

Calculation Zone B2 ($T_1 \leq T \leq TRES$)

Duration of this calculation zone may be from T=$T_1$ to T=TRES.

| | | |
|---|---|---|
| INPUT (main make-up stream) | = | (MMMUI)(CMMU)dT |
| INPUT (cooling tower) | = | (MSYS − MBDI)(CSYSI)d |
| OUTPUT (cooling system) | = | (MSYS)(CSYS)dT |
| ACCUMULATION | = | (VSUMP)(RHO)dCSYS |

Combining these formulas and expressing in finite increment form results in $$(CSYS)_{T+\Delta T}=(CSYS)_T+[(MMMUI)(CMMU)+(MSYS-MBDI)((CSYSI)-(MSYS)(CSYS)_T]\Delta T/[(VSUMP)(RHO)]$$

The above equation may be applied iteratively at each time increment starting from T=$T_1$ to obtain the value of CSYS as a function of time. It is applied in Zone B2 from T=$T_1$ to T=TRES.

Calculation Zone C2 (TRES<T)

This calculation zone starts at T=TRES and continues as long as desired.

| | | |
|---|---|---|
| INPUT (main make-up stream) | = | (MNMUI)(CMMU)dT |
| INPUT (cooling tower) | = | (MSYS − MBDI)((CSYS)$_{T-TRES}$)dT |
| OUTPUT (cooling system) | = | (MSYS)(CSYS)dT |
| ACCUMULATION | = | (VSUMP)(RHO)dCSYS |

Combining these equations and expressing in finite increment form results in $$(CSYS)_{T+\Delta T}=(CSYS)_T+[(MMMUI)(CMMU)+(MSYS-MBDI)((CSYS)_{T-TRES})-(MSYS)(CSYS)_T]\Delta T/[(VSUMP)(RHO)]$$

The above equation may be applied iteratively at each time increment starting from T=TRES to obtain the value of CSYS as a function of time. The calculation continues as long as desired. If this calculation is continued long enough, the composition of the water in the sump will return to the equilibrium value that existed when T=0.

Description of the Computer Program

The computer program uses the equations presented above. The main divisions of the program are as follows:

1. Display the program ownership, copyright and title of the program. Press any key.
2. The program asks for the cooling system identification.
3. Program describes Option No. 1 and Option No. 2. Requests user's choice of which option to run.

Option No. 1 is Chosen

1op1. The program displays list of data needed to run Option No. 1, and asks if all data required data are available. This requires a "Y" or "N" response. An "N" response goes to the end of the program, and requests if another set of data is to be run.

2op1. A "Y" response to No. 1op1 prompts the program to ask if the required data are stored. Requires a Y/N response. A "Y" response results in a request for the data on the intermittent stream(s) (see No. 4op1).

3op1. An "N" response to No. 2op1 results in a request to input the required data. When the data are all input the program stores the data as TWRDATA3 on a floppy disk in the A-drive. The program can be modified to store the data on hard disk if desired.

4op1. Program then requests data on the intermittent stream (s). If there is only one stream, the data for this stream are entered for stream No. 1. Zero (or carriage return) is entered for stream Nos. 2, 3 and 4. For several simultaneous streams, the data are entered for the required steams and zero (or [CR]) is entered for the remainder.

5op1. Program calculates effective concentration and total mass flow rate of combined intermittent stream(s).

6op1. The program then proceeds to do the required calculations and the results are displayed on the screen. Display includes program ownership and copyright, data on the cooling tower system, data on the intermittent stream(s) and the calculated results which is the blowdown flow rate and main make-up stream flow rate required so that the concentration in the tower sump is not affected by the intermittent stream(s).

7op1. Program asks if a hard copy of the results is desired. A "Y" response results in a printout of a copy of the same results that were displayed on the screen in No. 6op1. The "Y" response also brings up a request asking if other intermittent stream(s) are to be tried. A "Y" response brings a request for data on intermittent stream(s) (step 4op1). This procedure allows a number of intermittent stream combinations to be investigated using for the same cooling tower data.

8op1. An "N" response to No. 7op1 leads the program to ask if it is desired to try Option No. 2. A "Y" response brings the program to Option No. 2 (No. 1op2). An "N" response brings up a request asking if it is desired to try other data.

Option No. 2 is Chosen

1op2. This point in the program is reached by selecting Option No. 2 in No. 3 or selecting a "Y" response in No. 8op1. Program displays what is to be done in Option No. 2. Press any key.

2op2. Program displays data needed co run Option No. 2. Requires Y/N response. A "Y" response brings program to 3op2. An "N" response brings up a request asking if it is desired to try other data.

3op2. Program asks if required date are stored. Requires Y/N response. A "Y" response results in the data being input from the disk on which data is stored and the program proceeds to No. 5op2.

4op2. An "N" response to No. 3op2 leads to a request to input the data. After data are input, the input data are automatically stored on a floppy disk in the A-drive as TWRDATA1 and TWRDATA2. The program may be modified to store data on a hard disk if desired. Program proceeds to No. 5op2.

5op2. The program asks for the number of time increments for the whole calculation. The length of a time increment is set at $\frac{1}{20}$th of the residence time. Usually the calculations are continued some time after the intermittent stream (s) stop flowing. When the number of increments is entered the program proceeds to No. 6op2.

6op2. Program displays description of the procedure to use for the intermittent streams. Provision is made to include as many as four simultaneous intermittent streams. Press any key.

7op2. Program requests data on intermittent stream(s). If there is only one stream, the data for this stream are entered for stream No. 1. Zero (or [CR]) is entered for stream Nos. 2, 3 and 4. If several simultaneous streams are flowing the data are entered for the required steams and zero (or [CR]) is entered for the remainder.

8op2. Program calculates effective concentration and total mass flow rate of combined intermittent stream(s).

9op2. Program calculates some overall material balances on the whole system.

10op2. Program displays both cooling tower data and working data. Working data includes flow rates, and data on intermittent stream(s). Requires Y/N response. An "N" response returns the program to the data input section for Option No. 2. A "Y" response leads to the calculations for Option No. 2.

11op2. Program calculates water density, residence time and length of the time increment (TRES/20).

12op2. Program performs calculations for Zones A1, B1 and C1 or A2, B2 and C2.

13op2. Program displays summary of calculated results including the program ownership and copyright, tower system ID., number of finite time increments, time and concentration at beginning of flow of intermittent stream (s), at end of flow of intermittent stream(s) and at end of the calculation, total flow rate of intermittent stream(s), concentration gradient (raze of change of concentration with time) in the sump at end of flow of intermittent stream(s) and flow rate of blowdown.

14op2. Also displayed is a question asking whether another blowdown rate is to be used. Requires Y/N response. NOTE: If it is desired to record the calculated data an "N" response is required. There will be another opportunity to select another blowdown rate later.

15op2. If the response to No. 14op2 is "N", the program asks if it is desired to record the calculated results on a disk. Data recorded are time and concentration. Data recorded on disk can be plotted. Y/N response required. A "Y" response records the data. An "N" response goes to No. 16op2.

16op2. The program asks if it is desired to have a hard copy of a summary of the results. This hard copy summary is essentially the same data that were displayed on the screen in No. 13op2. However, all of the cooling tower and working data are included, also. Y/N response required. A "Y" response causes data to be printed. An "N" response brings program to 17op2.

17op2. The program then asks if it is desired to have a hard copy of the calculated results. This is a printout of time and concentration over the whole length of the calculation. Y/N response required. A "Y" response will cause data to be printed. An "N" response brings program to No. 18op2.

18op2. The program then asks again if it is desired to try another blowdown rate. Select a different blowdown either here or in No. 14op2. A "Y" response here or in No. 14op2 requests another blowdown rate. When this is entered, the cooling tower and working data are displayed and, with a "Y" response, the results are displayed as in No. 13op2. Use of various blowdown rates either here or in No. 14op2 will show the effect of various blowdown flow rates on the concentration-time relationship.

19op2. An "N" response to No. 18op21 brings up the question of whether another set of data are to be tried. Y/N response required. An "N" response brings the screen back to a display of the program after pressing any key. A "Y" response brings the program back to the data input section for Option No. 2.

Numerical Example No. 1—Single Stream

A numerical example is considered in which a single intermittent make-up stream flows into the cooling tower sump. Data for the cooling tower and its operation at equilibrium are as follows:

| | |
|---|---:|
| Concentration of the Main Make-up Stream | 100 mg/l |
| Initial System Concentration | 500 mg/l |
| Initial Mass Flow Rate of Main Make-up Stream | 5,000 lb/hr |
| Mass Rate of Circulation in the Cooling System | 50,000 lb/hr |
| Temperature of the Water in the Sump | 85° F. |
| Volume of Water in the Cooling System | 1,000 ft$^3$ |
| Volume of Water in the Cooling Tower Sump | 1,000 ft$^3$ |

Figure 7:
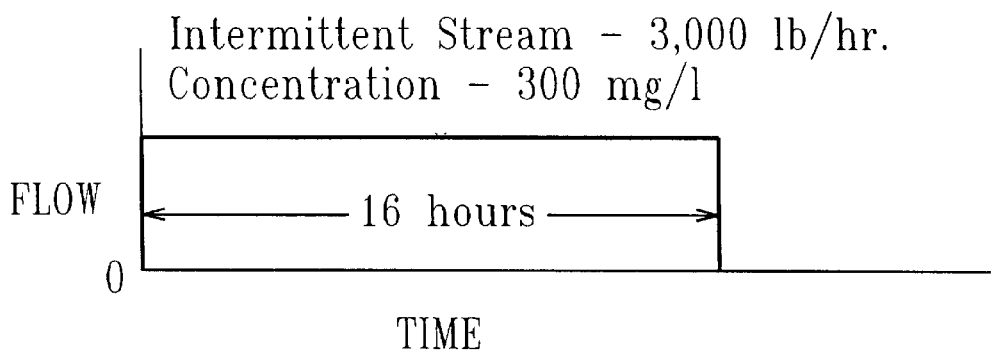
FIG. 7 represents a graph that illustrates flow of an intermittent stream into a cooling system.

The intermittent stream is shown in FIG. 7. Its flow rate is 3,000 lb/hr, its concentration is 300 mg/l and it flows for a period of 16 hours.

At the temperature of the sump the water density is 62.12 lb/ft$^3$. Thus the residence time, TRES, is (1000) (62.12)/50, 000=1.24 hr The length of a finite time increment is 1.24/20=0.062 hr.

Calculations for Option No. 1

The calculations for Option No. 1 give the blowdown rate and main make-up rate so that there is no change in the system concentration. That is, CSYSI remains at 500 mg/l. The following represent data included in a printout for Option No. 1. The data indicates that the required blowdown and main make-up stream flow rates are 2,500 and 3,500 lb/hr.

BLOWDOWN FLOW RATE REQUIRED IN ORDER TO MAINTAIN ORIGINAL WATER QUALITY IN THE TOWER SUMP WHEN AN INTERMITTENT STREAM OR STREAMS FLOW INTO THE SYSTEM

TOWER SYSTEM IDENTIFICATION—CT1

COOLING TOWER DATA

| COOLING TOWER DATA | |
|---|---:|
| CONCENTRATION OF THE MAIN MAKE-UP STREAM (mg/l) | 100 |
| INITIAL SYSTEM CONCENTRATION (mg/l) | 500 |
| INITIAL FLOW RATE OF MAIN MAKE-UP STREAM (lb/hr) | 5,000 |
| INITIAL BLOWDOWN FLOW RATE (lb/hr) | 1,000 |
| VAPOR FLOW RATE | 4,000 |
| DATA ON INTERMITTENT STREAM(S) | |
| NUMBER OF INTERMITTENT STREAM(S) | 1 |
| EFFECTIVE FLOW RATE OF STREAM(S) (lb/hr) | 3,000 |
| EFFECTIVE CONCENTRATION OF STREAM(S) (mg/l) | 300 |
| CALCULATED RESULTS | |
| REQUIRED BLOWDOWN FLOW RATE (lb/hr) | 2,500 |
| MAIN MAKE-UP STREAM FLOW RATE (lb/hr) | 3,500 |

Calculations for Option No 2

The calculations for Option No. 2 were done for several blowdown rates to determine the effect of blowdown rate on the concentration-time relationship.

The calculations were carried on for 500 time increments which means that the concentration was determined over a period of (500)(0.062)=31.1 hr from the time that the intermittent stream started flowing into the sump.

The results are tabulated in the following Table 1:

TABLE 1

Effect of Blowdown Rate on Sump Concentration when a Single Intermittent Stream with a Concentration of 300 mg/l Flows into the Sump at a Rate of 3,000 lb/hr for 16 Hours

| Blowdown Rate lb/hr | Main Make up Rate lb/hr | Concentration at T = 16 hr mg/l | Concentration Gradient in Sump (mg/l)/hr | Concentration at T = 31.1 hr mg/l |
|---|---|---|---|---|
| 1000 | 2000 | 573.9 | 4.64 | 564.3 |
| 1500 | 2500 | 547.9 | 3.01 | 541.7 |
| 2000 | 3000 | 523.3 | 1.46 | 520.3 |
| 2400 | 3400 | 504.6 | 0.29 | 504.0 |
| 2500 | 3500 | 500.0 | 0.00 | 500.0 |
| 2600 | 3600 | 495.5 | −0.28 | 496.1 |

Table 1 shows that as the blowdown rate is increased, the concentration at the end of the flow of the intermittent stream (16 hr) decreases and becomes equal to the equilibrium value (500 mg/l) when the blowdown flow rate is 2500 lb/hr. This agrees with the results obtained in Option No. 1. Also, as the blowdown rate increases, the rate of flow of the main make-up stream increases to maintain the constant hold-up of water in the system.

Figure 8:
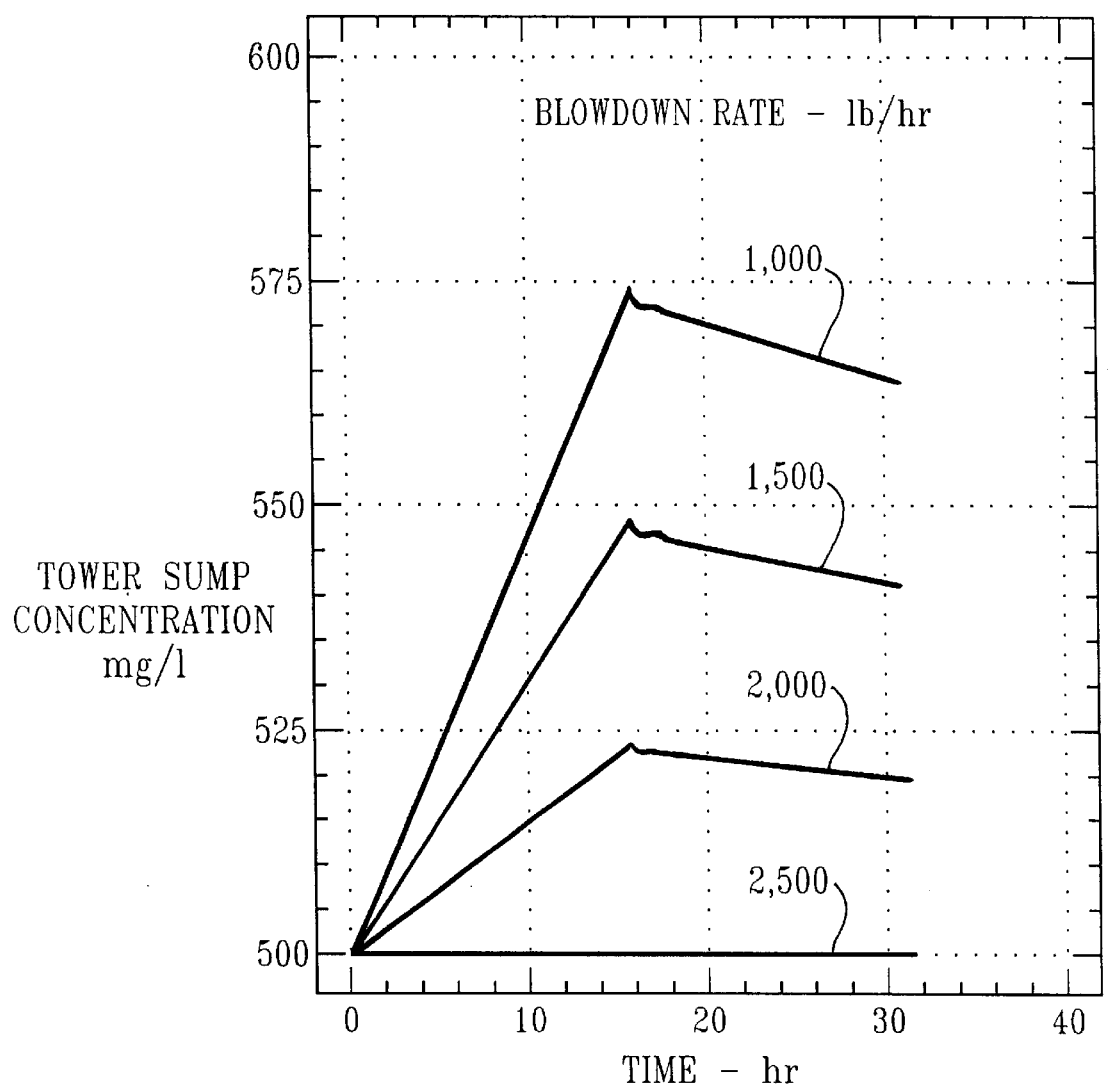
FIG. 8 represents a graph that illustrates a relationship between tower sump concentration and time in a cooling system.

Below is a sample printout of the results for a blowdown race of 1,000 lb/hr. FIG. 8 represents a plot of sump concentration versus time for four different blowdown rates. When the intermittent stream begins flowing into the sump the concentration creases immediately but as blowdown rate increases the rate of increase of the concentration decreases and finally becomes zero when the blowdown rate is 2,500 lb/hr as indicated in Table 1.

WATER QUALITY VARIATION IN A COOLING TOWER SYSTEM DUE TO INTERMITTENT WATER MAKE-UP STREAM(S)

TOWER SYSTEM IDENTIFICATION—CT1

NUMBER OF FINITE TIME INCREMENTS— 500

DATA ON COOLING TOWER SYSTEM

STORED DATA

STORED DATA

| | |
|---|---|
| CONCENTRATION OF THE MAIN MAKE-UP STREAM (mg/l) | 100. |
| INITIAL SYSTEM CONCENTRATION (mg/l) | 500. |
| INITIAL FLOW RATE OF BLOWDOWN (lb/hr) | 1,000. |
| INITIAL FLOW RATE OF MAIN MAKE-UP STREAM (lb/hr) | 5,000. |
| RATE OF CIRCULATION IN COOLING SYSTEM (lb/hr) | 50,000. |
| TEMPERATURE OF THE WATER IN THE SUMP | 85. |
| VOLUME OF WATER IN COOLING SYSTEM (cu. ft.) | 1,000. |
| VOLUME OF WATER IN THE COOLING TOWER SUMP (cu. ft.) | 1,000. |

WORKING DATA

| | |
|---|---|
| TIME OF CALCULATION (hr) | 31. |
| FLOW RATE OF VAPOR FROM TOWER (lb/hr) | 4,000. |
| FLOW RATE OF BLOWDOWN (lb/hr) | 1,000. |
| FLOW RATE OF MAIN MAKE-UP STREAM (lb/hr) | 2,000. |
| FLOW RATE OF INTERMITTENT STREAM(S) (lb/hr) | 3,000. |
| CONCENTRATION OF THE INTERMITTENT STREAM(S) (mg/l) | 300. |
| TIME OF FLOW OF THE INTERMITTENT STREAM (hr) | 16. |
| NUMBER OF INTERMITTENT STREAM(S) | 1 |

RESULTS

CONCENTRATION IN SUMP

| | TIME Hr | SUMP CONCENTRATION mg/l |
|---|---|---|
| START OF INTERMITTENT STREAM(S): | 0.0 | 500.0 |
| END OF INTERMITTENT STREAM(S): | 16.0 | 573.9 |
| END OF CALCULATION: | 31.1 | 564.3 |
| CONCENTRATION GRADIENT IN SUMP, (mg/l)/hr: | 4.64 | |

Numerical Example No. 2—Two Intermittent Streams which Flow Simultaneously Part of the Time A numerical example is considered in which two intermittent make-up streams flow into the cooling tower sump. Data for the cooling tower and its operation at equilibrium are as follows:

| | |
|---|---|
| Concentration of the Main Make-up Stream | 100 mg/l |
| Initial System Concentration | 500 mg/l |
| Initial Mass Flow Rate of Main Make-up Stream | 5,000 lb/hr |
| Mass Rate of Circulation in the Cooling System | 50,000 lb/hr |
| Temperature of the Water in the Sump | 85° F. |
| Volume of Water in the Cooling System | 1,000 ft$^3$ |
| Volume of Water in the Cooling Tower Sump | 1,000 ft$^3$ |

Figure 9:
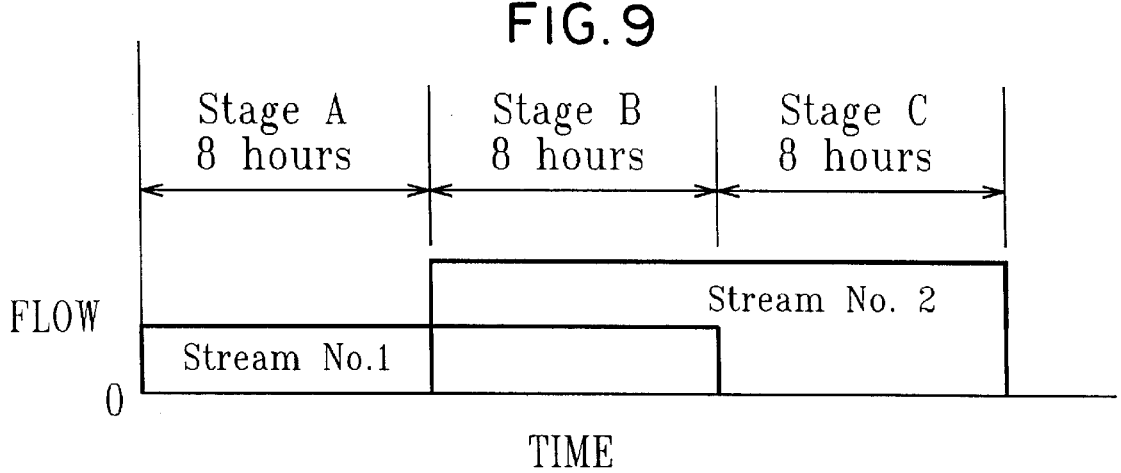
FIG. 9 represents a graph that illustrates flow of two intermittent streams into a cooling system.

The intermittent streams are shown in FIG. 9. The flow rate of Stream No. 1 is 1,000 lb/hr, its concentration is 300 mg/l and it flows for a period of 16 hours. The flow rate of Stream No. 2 is 2,000 lb/hr, its concentration is 50 mg/l and it flows for a period of 16 hours. However, Stream No. 2 starts to flow into the sump 8 hours after Stream No. 1 starts to flow. Thus, for a period of 8 hours, the two streams are flowing simultaneously into the sump.

Calculations for Option No. 1

The calculations are conducted in three stages:

Stage A: Stream No. 1 flows for 8 hours

Stage B: Stream Nos. 1 and 2 flow simultaneously for 8 hours

Stage C: Stream No. 2 flows for 8 hours.

At each stage, a blowdown rate is determined for which the concentration in the tower sump is equal to that which existed at equilibrium, i.e., 500 mg/l.

The results of the calculations are shown in Table 2 for each stage of the calculations. The required blowdown rate that results in no change of the concentration of the water in the sum is shown in the fourth column.

TABLE 2

Results for Two Intermittent Streams Flowing Simultaneously Part of the Time

| Calculation Stage | Effective Concentration of Intermittent Stream mg/l | Effective Mass Flow Rate of Intermittent Stream lb/hr | Blowdown Rate at which the sump concentration is at original value lb/hr | Mass Flow Rate of Main Make-up Stream lb/hr |
|---|---|---|---|---|
| A Stream No. 1 | 300 | 1000 | 1500 | 4500 |
| B Streams Nos. 1 & 2 | 133 | 3000 | 1250 | 2250 |
| C Stream No. 2 | 50 | 2000 | 750 | 2750 |

Below represent the are printouts of the results for calculation Stages A, B and C, respectively.

BLOWDOWN FLOW RATE REQUIRED IN ORDER TO MAINTAIN ORIGINAL WATER QUALITY IN THE TOWER SUMP WHEN AN INTERMITTENT STREAM OR STREAMS FLOW INTO THE SYSTEM

TOWER SYSTEM IDENTIFICATION—CT2

| COOLING TOWER DATA | |
|---|---|
| CONCENTRATION OF THE MAIN MAKE-UP STREAM (mg/l) | 100. |
| INITIAL SYSTEM CONCENTRATION (mg/l) | 500. |
| INITIAL FLOW RATE OF MAIN MAKE-UP STREAM (lb/hr) | 5,000. |
| INITIAL BLOWDOWN FLOW RATE (lb/hr) | 1,000. |
| VAPOR FLOW RATE | 4,000. |
| DATA ON INTERMITTENT STREAM(S) | |
| NUMBER OF INTERMITTENT STREAM(S) | 1 |
| EFFECTIVE FLOW RATE OF STREAM(S) (lb/hr) | 1,000. |
| EFFECTIVE CONCENTRATION OF STREAM(S) (mg/l) | 300. |
| CALCULATED RESULTS | |
| REQUIRED BLOWDOWN FLOW RATE (lb/hr) | 1,500. |
| MAIN MAKE-UP STREAM FLOW RATE (lb/hr) | 4,500. |

BLOWDOWN FLOW RATE REQUIRED IN ORDER TO MAINTAIN ORIGINAL WATER QUALITY IN THE TOWER SUMP WHEN AN INTERMITTENT STREAM OR STREAMS FLOW INTO THE SYSTEM

TOWER SYSTEM IDENTIFICATION—CT2

| COOLING TOWER DATA | |
|---|---|
| CONCENTRATION OF THE MAIN MAKE-UP STREAM (mg/l) | 100. |
| INITIAL SYSTEM CONCENTRATION (mg/l) | 500. |
| INITIAL FLOW RATE OF MAIN MAKE-UP STREAM (lb/hr) | 5,000. |
| INITIAL SLOWDOWN FLOW RATE (lb/hr) | 1,000. |
| VAPOR FLOW RATE | 4,000. |
| DATA ON INTERMITTENT STREAM(S) | |
| NUMBER OF INTERMITTENT STREAM(S) | 2 |
| EFFECTIVE FLOW RATE OF STREAM(S) (lb/hr) | 3,000. |
| EFFECTIVE CONCENTRATION OF STREAM(S) (mg/l) | 133. |
| CALCULATED RESULTS | |
| REQUIRED BLOWDOWN FLOW RATE (lb/hr) | 1,250. |
| MAIN MAKE-UP STREAM FLOW RATE (lb/hr) | 2,250. |

BLOWDOWN FLOW RATE REQUIRED IN ORDER TO MAINTAIN ORIGINAL WATER QUALITY IN THE TOWER SUMP WHEN AN INTERMITTENT STREAM OR STREAMS FLOW INTO THE SYSTEM

TOWER SYSTEM IDENTIFICATION—CT2

| COOLING TOWER DATA | |
|---|---|
| CONCENTRATION OF THE MAIN MAKE-UP STREAM (mg/l) | 100. |
| INITIAL SYSTEM CONCENTRATION (mg/l) | 500. |
| INITIAL FLOW RATE OF MAIN MAKE-UP STREAM (lb/hr) | 5,000. |
| INITIAL BLOWDOWN FLOW RATE (lb/hr) | 1,000. |
| VAPOR FLOW RATE | 4,000. |
| DATA ON INTERMITTENT STREAM(S) | |
| NUMBER OF INTERMITTENT STREAM(S) | 1 |
| EFFECTIVE FLOW RATE OF STREAM(S) (lb/hr) | 2,000. |
| EFFECTIVE CONCENTRATION OF STREAM(S) (mg/l) | 50. |
| CALCULATED RESULTS | |
| REQUIRED BLOWDOWN FLOW RATE (lb/hr) | 750. |
| MAIN MAKE-UP STREAM FLOW RATE (lb/hr) | 2,750. |

The foregoing description of the invention illustrates and describes the present invention. Additionally, the disclosure shows and describes only the preferred embodiments of the invention, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

We claim:

1. An article of manufacture for use in programming a processor having at least one output device and data storage device attached thereto, the article of manufacture including a processor-readable medium having one or more programs embodied therein for performing a method for developing an application, the method comprising the steps of:

selecting at least one performance parameter relating to conditions within an aqueous system, wherein said at least one performance parameter includes a corrosion rate;

measuring a value of the corrosion rate to serve as a baseline corrosion rate value;

determining capacity of the aqueous system and measuring and monitoring flow rates of water into and out of the aqueous system;

remeasuring the value of the corrosion rate and comparing the remeasured value to the baseline corrosion rate value and factoring in the flow rates of water into and out of the system; and altering at least one controllable variable within the aqueous system based upon a deviation of the remeasured corrosion rate value from the baseline corrosion rate value.

2. The article of manufacture of claim 1, wherein, in the method performed by the one or more programs embodied therein, the at least one controllable variable includes a feed rate for at least one treatment compound for controlling at least one condition within the aqueous system.

3. An article of manufacture for use in programming a processor having at least one output device and data storage device attached thereto, the article of manufacture including a processor-readable medium having one or more programs embodied therein for performing a method for developing an application, the method comprising the steps of:

selecting at least one performance parameter relating to conditions within an aqueous system, wherein said at least one performance parameter includes a corrosion rate;

measuring a value of the at least one performance parameter to serve as a baseline value for the at least one performance parameter;

determining capacity of the aqueous system and measuring and monitoring flow rates of water into and out of the aqueous system;

measuring the value of the at least one performance parameter and comparing the value to the baseline value for the at least one performance parameter and factoring in the flow rates of water into and out of the system;

altering at least one controllable variable within the aqueous system based upon a deviation of the value of the at least one performance parameter from the baseline value for the at least one performance parameter;

altering the at least one controllable variable a first amount in a first direction;

monitoring the at least one performance parameter to detect a change in the performance parameter from the baseline value for the at least one performance parameter caused by alteration of the controllable variable over a first time period;

again altering the at least one controllable variable the first amount in the first direction if the performance parameter changes over the first time period;

terminating alteration of the at least one controllable variable when the performance parameter ceases to change after alteration of the at least one controllable variable;

continuing to monitor the performance parameter until a change is detected in the performance parameter over a second time period;

determining a setpoint for the at least one controllable variable;

altering the at least one controllable variable in a second direction opposite to the first direction in the first amount;

monitoring the at least one performance parameter to detect a change in the at least one performance parameter caused by the alteration of the at least one controllable variable in the second direction over a third time period; and again altering the at least one controllable variable the first amount in the second direction if the at least one performance parameter changes over the third time period until the at least one controllable variable reaches the setpoint.

4. An article of manufacture for use in programming a processor having at least one output device and data storage device attached thereto, the article of manufacture including a processor-readable medium having one or more programs embodied therein for performing a method for developing an application, the method comprising the steps of:

selecting at least one performance parameter relating to conditions within an aqueous system, wherein said at least one performance parameter includes a corrosion rate;

measuring a value of the at least one performance parameter to serve as a baseline value for the at least one performance parameter;

determining capacity of the aqueous system and measuring and monitoring flow rates of water into and out of the aqueous system;

measuring the value of the at least one performance parameter and comparing the value to the baseline value for the at least one performance parameter and factoring in the flow rates of water into and out of the system;

altering at least one controllable variable within the aqueous system based upon a deviation of the value of the at least one performance parameter from the baseline value for the at least one performance parameter;

selecting a plurality of performance parameters including the corrosion rate; and measuring and comparing each of the plurality of performance parameters to corresponding baseline values after measuring and comparing the value of corrosion rate to a baseline value of corrosion rate, wherein a value of each of the plurality of performance parameters are measured are compared to the corresponding baseline values depending upon whether and how the corrosion rate changes.

5. The article of manufacture of claim 4, wherein, in the method performed by the one or more programs embodied therein:

the plurality of performance parameters include oxidation-reduction potential and fouling factor, the at least one controllable variable includes feed rate of a corrosion inhibitor, feed rate of material affecting oxidation-reduction potential, feed rate of material affecting fouling, and feed rate of halogen, the corrosion rate is measured and compared to the setpoint value for corrosion rate, oxidation-reduction potential is measured and compared to the setpoint for oxidation-reduction potential if the corrosion rate decreases, the feed rate of the corrosion inhibitor is reduced if the oxidation-reduction potential decreases and the method is recycled to the point where corrosion rate is first measured and compared to the baseline value for corrosion rate, fouling factor or fouling index is measured and compared to the setpoint for fouling factor or fouling index if the oxidation-reduction potential increases, the rate of change of fouling factor is determined if a change in fouling factor is detected and feed of the treatment materials affecting oxidation-reduction potential and fouling are controlled until the setpoints are obtained, and the method is recycled to the point where corrosion rate is first measured and compared to the baseline value for corrosion rate, or, alternatively, fouling factor or fouling index is measured and compared to the setpoint for fouling factor or fouling index if the oxidation-reduction potential increases, the feed rate of halogen into the system is increased and the oxidation-reduction potential is measured and compared to the setpoint for oxidation-reduction potential again if a change in the fouling factor or fouling index is not detected, the method is recycled to the point where corrosion rate is first measured and compared to the baseline value if oxidation-reduction potential is at a setpoint, fouling factor or fouling index is again measured and compared to the setpoint for fouling factor or fouling index if oxidation-reduction potential deviates from a setpoint.

6. The article of manufacture of claim 4, wherein, in the method performed by the one or more programs embodied therein:

the plurality of performance parameters include pH and fouling factor or fouling index, and the at least one controllable variable includes feed rate of pH adjusting material, feed rate of corrosion inhibitor, feed rate of material to control fouling, and operational parameters of the cooling system.

* * * * *